(12) United States Patent
Suzuki

(10) Patent No.: US 6,586,771 B2
(45) Date of Patent: Jul. 1, 2003

(54) SOLID STATE IMAGING DEVICE HAVING A DRIVER CIRCUIT COMPOSED OF A STORAGE SYSTEM AND A SIGNAL GENERATOR IN THE SAME SUBSTRATE

(75) Inventor: Nobuo Suzuki, Miyagi (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/791,814

(22) Filed: Feb. 26, 2001

(65) Prior Publication Data

US 2001/0017659 A1 Aug. 30, 2001

(30) Foreign Application Priority Data

Feb. 29, 2000 (JP) .......................................... 2000-54582

(51) Int. Cl.$^7$ .............................................. H01L 29/04
(52) U.S. Cl. .............................. 257/72; 257/79; 257/88; 257/82; 257/296
(58) Field of Search .............................. 257/72, 79, 88, 257/82, 296

(56) References Cited

U.S. PATENT DOCUMENTS

| 4,142,069 | A | * | 2/1979 | Stover |
| 5,153,699 | A | * | 10/1992 | Shirotori et al. |
| 5,671,204 | A | * | 9/1997 | Yokouchi et al. |
| 5,952,854 | A | * | 9/1999 | Kubota et al. |
| 6,369,515 | B1 | * | 4/2002 | Okuda |

* cited by examiner

Primary Examiner—Fetsum Abraham
(74) Attorney, Agent, or Firm—Arent Fox Kintner Plotkin & Kahn, PLLC

(57) ABSTRACT

A timing signal generating device to drive a solid-state image pickup device including a large number of photoelectric converter elements arranged in a matrix shape, a vertical transfer path arranged for each photoelectric converter element column in the vicinity thereof, and a horizontal transfer path connected to an end section of each vertical transfer path includes at least one rewritable storage in which stored information can be rewritten by an external controller and a timing signal generating section which can generate a sequence of a plurality of kinds of timing signals corresponding to an operation mode of the solid-state image pickup device according to data stored in the storage. Therefore, generating points of time, signal waveforms, and the like of various kinds of timing signals to drive a solid-state image pickup device can be easily changed according to specifications of devices using the solid-state image pickup device as an area image sensor.

27 Claims, 12 Drawing Sheets

FIG.2

| | FIRST FIELD | SECOND FIELD | FOURTH FIELD | THIRD FIELD |
|---|---|---|---|---|
| RECORD 1: | CONTROL CODE | ITERATION COUNT CODE | OPERATION SETTING CODE | START ADDRESS |
| RECORD 2: | CONTROL CODE | ITERATION COUNT CODE | OPERATION SETTING CODE | START ADDRESS |
| RECORD 3: | CONTROL CODE | ITERATION COUNT CODE | OPERATION SETTING CODE | START ADDRESS |
| RECORD 4: | CONTROL CODE | ITERATION COUNT CODE | OPERATION SETTING CODE | START ADDRESS |
| RECORD 5: | CONTROL CODE | ITERATION COUNT CODE | OPERATION SETTING CODE | START ADDRESS |
| RECORD 6: | CONTROL CODE | ITERATION COUNT CODE | OPERATION SETTING CODE | START ADDRESS |
| RECORD 7: | CONTROL CODE | ITERATION COUNT CODE | OPERATION SETTING CODE | START ADDRESS |
| RECORD 8: | CONTROL CODE | ITERATION COUNT CODE | OPERATION SETTING CODE | START ADDRESS |
| RECORD 9: | CONTROL CODE | ITERATION COUNT CODE | OPERATION SETTING CODE | START ADDRESS |
| RECORD 10: | CONTROL CODE | ITERATION COUNT CODE | OPERATION SETTING CODE | START ADDRESS |
| RECORD 11: | CONTROL CODE | ITERATION COUNT CODE | OPERATION SETTING CODE | START ADDRESS |
| RECORD 12: | CONTROL CODE | ITERATION COUNT CODE | OPERATION SETTING CODE | START ADDRESS |
| ... | ... | ... | ... | ... |

FIG.3

| | FIRST FIELD | SECOND FIELD | THIRD FIELD |
|---|---|---|---|
| RECORD 1: | CONTROL CODE | ITERATION COUNT CODE | SIGNAL PATTERN CODE |
| RECORD 2: | CONTROL CODE | ITERATION COUNT CODE | SIGNAL PATTERN CODE |
| RECORD 3: | CONTROL CODE | ITERATION COUNT CODE | SIGNAL PATTERN CODE |
| RECORD 4: | CONTROL CODE | ITERATION COUNT CODE | SIGNAL PATTERN CODE |
| RECORD 5: | CONTROL CODE | ITERATION COUNT CODE | SIGNAL PATTERN CODE |
| RECORD 6: | CONTROL CODE | ITERATION COUNT CODE | SIGNAL PATTERN CODE |
| RECORD 7: | CONTROL CODE | ITERATION COUNT CODE | SIGNAL PATTERN CODE |
| RECORD 8: | CONTROL CODE | ITERATION COUNT CODE | SIGNAL PATTERN CODE |
| RECORD 9: | CONTROL CODE | ITERATION COUNT CODE | SIGNAL PATTERN CODE |
| RECORD 10: | CONTROL CODE | ITERATION COUNT CODE | SIGNAL PATTERN CODE |
| RECORD 11: | CONTROL CODE | ITERATION COUNT CODE | SIGNAL PATTERN CODE |
| RECORD 12: | CONTROL CODE | ITERATION COUNT CODE | SIGNAL PATTERN CODE |
| ... | | | |

FIG.6

| | FIRST FIELD (CONTROL CODE) | SECOND FIELD (ITERATION COUNT CODE) | THIRD FIELD (SIGNAL PATTERN CODE) |
|---|---|---|---|
| RECORD 1: | 00 | 0010 | 0011 |
| RECORD 2: | 00 | 0010 | 0001 |
| RECORD 3: | 00 | 0010 | 1001 |
| RECORD 4: | 00 | 0010 | 1000 |
| RECORD 5: | 00 | 0010 | 1100 |
| RECORD 6: | 00 | 0010 | 0100 |
| RECORD 7: | 00 | 0010 | 0110 |
| RECORD 8: | 00 | 0010 | 0010 |
| RECORD 9: | 00 | 0010 | 0011 |
| RECORD 10: | 11 | 0000 | 0000 |

FIG.8

| | FIRST FIELD (CONTROL CODE) | SECOND FIELD (ITERATION COUNT CODE) | THIRD FIELD (SIGNAL PATTERN CODE) |
|---|---|---|---|
| RECORD 1: | 01 | 0100 | 0000 |
| RECORD 2: | 00 | 0010 | 0011 |
| RECORD 3: | 00 | 0010 | 0001 |
| RECORD 4: | 00 | 0010 | 1001 |
| RECORD 5: | 00 | 0010 | 1000 |
| RECORD 6: | 00 | 0010 | 1100 |
| RECORD 7: | 00 | 0010 | 0100 |
| RECORD 8: | 00 | 0010 | 0110 |
| RECORD 9: | 00 | 0010 | 0010 |
| RECORD 10: | 10 | 0010 | 0000 |
| RECORD 11: | 00 | 0000 | 0011 |
| RECORD 12: | 11 | 0000 | 0000 |

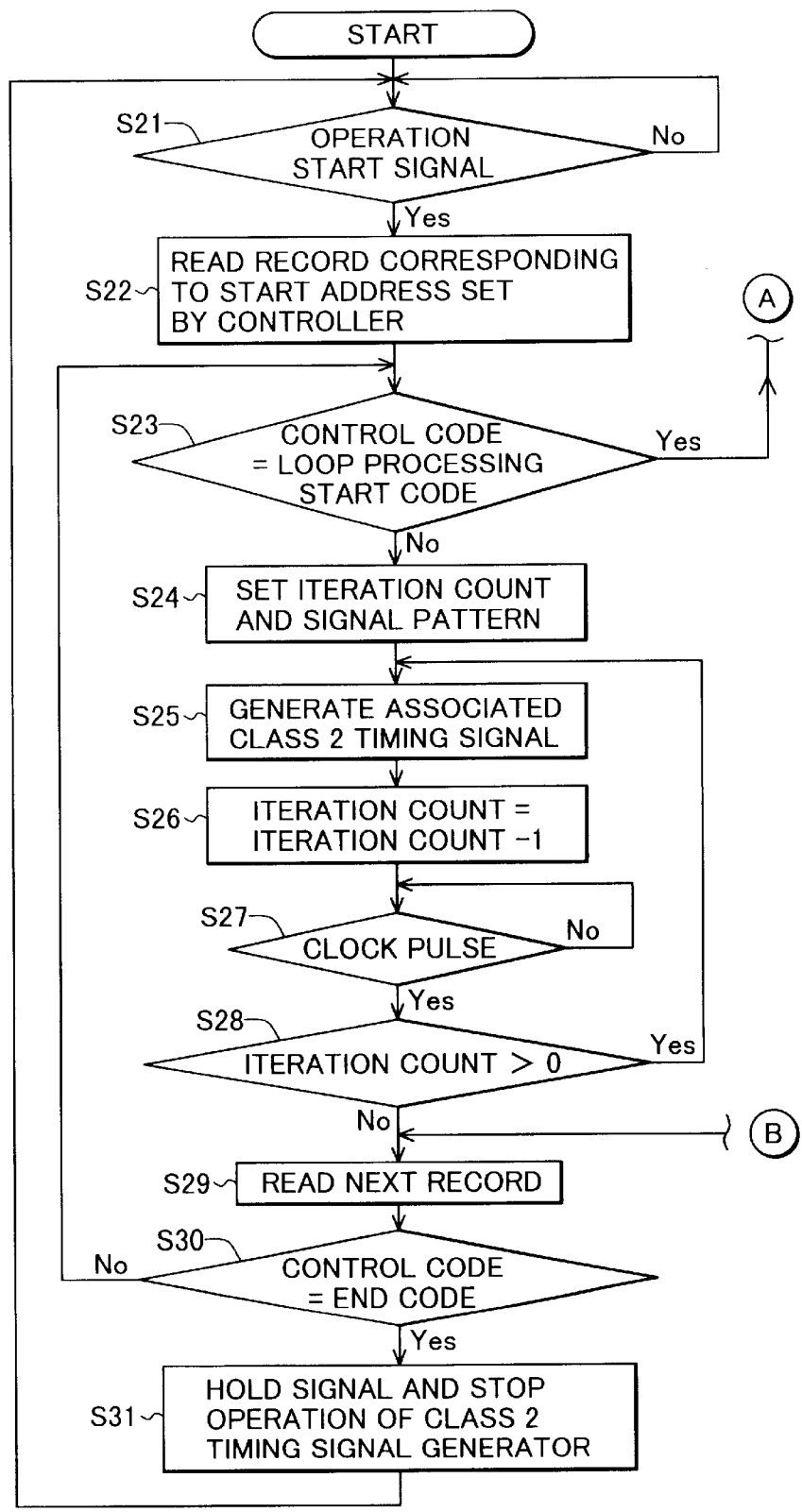

SOLID STATE IMAGING DEVICE HAVING A DRIVER CIRCUIT COMPOSED OF A STORAGE SYSTEM AND A SIGNAL GENERATOR IN THE SAME SUBSTRATE

This application is based on Japanese Patent Application 2000-54582 filed on Feb. 29, 2000, the entire contents of which are incorporated herein by reference.

BACKGROUND OF THE INVENTION a) Field of the Invention

The present invention relates to a timing signal generating device for generating a plurality of kinds of timing signals to drive a solid-state image pickup device including a large number of photoelectric converter elements arranged in a matrix shape and a method of generating the plurality of kinds of timing signals.

The present invention further relates to an electronic apparatus including an electronic device driven by a plurality of kinds of timing signals, the apparatus controlling generation of the timing signals using predetermined data.

b) Description of the Related Art

After the technique to mass-produce charge-coupled devices (CCDs) was established, apparatus such as video cameras, digital cameras, and the like using solid-state image pickup devices of CCD type as area image sensors are rapidly prevailing.

On the other hand, with development of personal digital assistants, a solid-state image pickup device of metal oxide semiconductor (MOS) type consuming less power than the CCD-type solid-state image pickup device is also being developed.

Each of the CCD-type and MOS-type solid-state image pickup devices for an area image sensor includes a large number of photoelectric converter elements. As the photoelectric converter element, a photo diode is used in many cases.

In this specification, "a large number of photoelectric converter elements arranged in a matrix form" implies not only "a large number of photoelectric converter elements arranged in a square matrix form (including a matrix in which the number of rows is not equal to the number of columns)" but also "a large number of photoelectric converter elements arranged in a shifted-pixel layout".

In the shifted-pixel layout including a large number of photoelectric converter elements, the photoelectric converter elements in the odd photoelectric converter element columns are respectively shifted relative to those in the even photoelectric converter element columns by about one half of a pitch $P_1$ of photoelectric converter elements in each photoelectric converter element column in a direction of the column. The photoelectric converter elements in the odd photoelectric converter element rows are respectively shifted relative to those in the even photoelectric converter element rows by about one half of a pitch $P_2$ of photoelectric converter elements in each photoelectric converter element row in a direction of the row. Each photoelectric converter element row includes photoelectric converter elements of only odd or even photoelectric converter element columns. The pitches $P_1$ and $P_2$ may be equal or unequal to each other.

"About one half of the pitch $P_1$" includes, in addition to $P_1/2$, any value which is different from $P_1/2$ because of factors such as a manufacturing error and a rounding error of a pixel position appearing in a design phase or a mask fabrication process and which nevertheless can be regarded as substantially equivalent to $P_1/2$ in consideration of obtained performance of the solid-state image pickup device and picture quality thereof. This also applies to "about one half of the pitch $P_2$" in this specification.

To obtain image data by a solid-state image pickup device including a large number of photoelectric converter elements in a matrix shape, a plurality of kinds of timing signals are required to appropriately drive various constituent elements disposed in the solid-state image pickup device.

For example, a CCD-type solid-state image pickup device requires such timing signals as driving pulses to drive vertical transfer CCDs (VCCDs), driving pulses to drive a horizontal transfer CCD (HCCD), and horizontal synchronizing pulses. Depending on performance of the solid-state image pickup device or performance of the apparatus using the solid-state image pickup device, overflow drain pulses for electronic shutters, clamp pulses for optical black signals, and the like are required.

Of the timing signals necessary for driving the solid-state image pickup device, the HCCD drive pulses, the horizontal sync pulses, the clamp pulses for optical black signals, the overflow drain pulses for electronic shutters and the like have fundamentally a repetition period of one horizontal scan period. Each of these timing signals has a constant pulse waveform in each horizontal scan period. However, the overflow drain pulse and the like are not always used with a repetition period of one horizontal scan period. The overflow drain pulse is not used under a certain operation mode or the like of the solid-state image pickup device. The number and the pulse waveform of each VCCD drive pulses or the like in one horizontal scan period are not fixed.

In this specification, each of the timing signals fundamentally used with a repetition period of one horizontal scan period to drive the solid-state image pickup device and has a constant pulse waveform is called "class 1 timing signal" depending on cases. The class 1 timing signals include the HCCD drive pulses, the horizontal sync pulses, the clamp pulses for optical black signals, and the overflow drain pulses for electronic shutters.

Each of the timing signals generated in horizontal scan periods to drive the solid-state image pickup device and the number of pulses or the pulse waveform thereof in one horizontal scan period is not fixed is called "class 2 timing signal" depending on cases. The class 2 timing signals include the VCCD drive pulses.

A timing signal generating device to generate class 1 and class 2 timing signals is disposed in or outside the solid-state image pickup device. The timing signal generating device includes a storage and a timing signal generator.

The storage stores data defining the class 1 and class 2 timing signals. The storage also stores data to control generation of each of the class 1 and class 2 timing signals in a unit of one horizontal scan period.

In this specification, data defining class 1 timing signals is called "class 1 timing signal generating data" and data defining class 2 timing signals is called "class 2 timing signal generating data". Data to control generation of each of the class 1 and class 2 timing signals in a unit of one horizontal scan period is called "signal generation control data". The class 1 timing signal generating data, the class 2 timing signal generating data, and the signal generation control data are collectively called "timing signal generating data" in some cases.

The timing signal generating device generates, according to the timing signal generating data, each of the class 1 and class 2 timing signals at a predetermined point of time respectively.

The signal generating point of time and the signal waveform of each of the class 1 and class 2 timing signals vary depending on the number of pixels, the drive method, and the like of the solid-state image pickup device. The number of pixels, the drive method, and the like of the solid-state image pickup device generally vary according to specifications of an apparatus using the solid-state image pickup device as an area image sensor.

Heretofore, each time specifications of an apparatus using a solid-state image pickup device as an area image sensor is determined, hardware of a timing signal generating device for the solid-state image pickup device is designed and is fabricated.

Even for a slight change of the hardware, the designing and fabrication of the timing signal generating device require a great expense and a long period of development and hence resultantly raises the price of the product. Due to delay in delivery of the product, a business change may be missed in same cases.

SUMMARY OF THE INVENTION

It is therefore an object of the present invention to provide a timing signal generating device in which generating points of time and signal waveforms of various kinds of timing signals to drive a solid-state image pickup device can be easily changed according to specifications of apparatus using the solid-state image pickup device as an area image sensor.

Another object of the present invention is to provide a method of generating timing signals for driving a solid-state image pickup device, in which generating points of time and signal waveforms of various kinds of timing signals can be easily changed according to specifications of apparatus using the solid-state image pickup device as an area image sensor.

A further another object of the present invention is to provide an electronic apparatus which includes an electronic device to be driven by using timing signals of a plurality of kinds and which can generate the timing signals by using a relatively small amount of data.

According to one aspect of the present invention, there is provided a timing signal generating device for generating timing signals adapted for driving a solid-state image pickup device, wherein the image pickup device has a large number of photoelectric converter elements arranged in a row and column matrix and is capable of generating and outputting image signals for one frame in a plurality of horizontal scan periods, the image signals being generated and outputted within one horizontal scan period represent signal charges accumulated in the photoelectric converter elements of at least one row, the image pickup device has at least one operation mode, a plurality of operations is done in every said operation mode, the timing signal generating device comprising: at least one rewritable storage formed on a semiconductor substrate, for rewritably storing data; and a timing signal generator integrated together with said storage on the semiconductor substrate for receiving clock pulses, counting number of the clock pulses and generating, according to the data stored in said storage, a sequence of timing signals of a plurality of kinds for every operation mode of the solid-state image pickup device.

According to another aspect of the present invention, there is provided a method of generating timing signals adapted for driving a solid-state image pickup device, wherein the image pickup device has a large number of photoelectric converter elements arranged in a row and column matrix and is capable of generating and outputting image signals for one frame in a plurality of horizontal scan periods, the image signals being generated and outputted within one horizontal scan period represent signal charges accumulated in the photoelectric converter elements of at least one row, the image pickup device has at least one operation mode, a plurality of operations is done in every said operation mode, the method of generating timing signals comprising steps of; storing data necessary to generate the timing signals in at leas one rewritable storage formed on a semiconductor substrate, for rewritably storing data; and processing the data stored in said storage and generating a sequence of timing signals of a plurality of kinds for every operation mode of the solid-state image pickup device by using a timing signal generator integrated together with said storage on the semiconductor substrate, said timing signal generator receiving clock pulses and counting number of the clock pulses for detecting timing.

According to still another aspect of the present invention, there is provided an electronic apparatus, comprising; an electronic device driven by using (i) a plurality of kinds of first timing signals each of which is generated with a fixed repetition period and has a constant pulse waveform in every repetition period and (ii) a plurality of kinds of second timing signals each of which is generated in said repetition periods and in each of which the pulse waveform or number of pulses in said repetition period is not fixed, the generation of said first and second timing signals in every said repetition period is defined by signal generation control data, the electronic device has at least one operation mode, a plurality of operations is done in every said operation mode; and a timing signal generating device for generating said first and second timing signals adapted for driving said electronic device, wherein said signal generation control data includes at least one record for every operation mode of said electronic device, every said record includes a first field in which a control code for controlling one of the operations is recorded, a second field in which a code indicating one or more numerals representing one repetition period or successive repetition periods, said operation is executed once in every said repetition period, is recorded, and a third field in which a start address in said at least one rewritable storage, first record of a data defining the operation to be controlled by said control code being recorded at said start address, is recorded.

In the configuration of the timing signal generating device including at least one rewritable storage and a timing signal generator, the generating points of time, the signal waveforms, and the like of various kinds of timing signals to be generated by the timing signal generating device can be easily changed only by rewriting, by an external controller, timing signal generating data stored in the storage. Change in hardware of the timing signal generating device is not necessarily required.

The generating points of time and the signal waveforms of various kinds of timing signals adapted for driving a solid-state image pickup device can be easily changed according to specifications of apparatus using the solid-state image pickup device.

The signal generation control data for controlling generation of a timing signal includes an iteration count code as above, and hence the amount of data for control signal generation can be reduced. In an electronic apparatus including an electronic device to be driven by using timing signals of a plurality of kinds, the timing signals can be generated by using a relatively small amount of data.

BRIEF DESCRIPTION OF THE DRAWINGS

The objects and features of the present invention will become more apparent from the consideration of the following detailed description taken in conjunction with the accompanying drawings in which:

FIG. 2 is a block diagram partly showing an example of signal generation control data;

FIG. 3 is a block diagram partly showing an example of class 2 timing signal generating data;

FIG. 6 is a code table showing an example of class 2 timing signal generating data to generate the vertical transfer pulses XV1 to XV4 shown in FIG. 5;

FIG. 8 is a code table showing an example of class 2 timing signal generating data to generate the vertical transfer pulses XV1 to XV4 shown in FIG. 7;

FIGS. 9A and 9B are flowcharts schematically showing an example of operation of the class 2 timing signal generator in the timing signal generating device of the embodiment.

DESCRIPTION OF THE PREFERRED EMBODIMENTS

Figure 1:
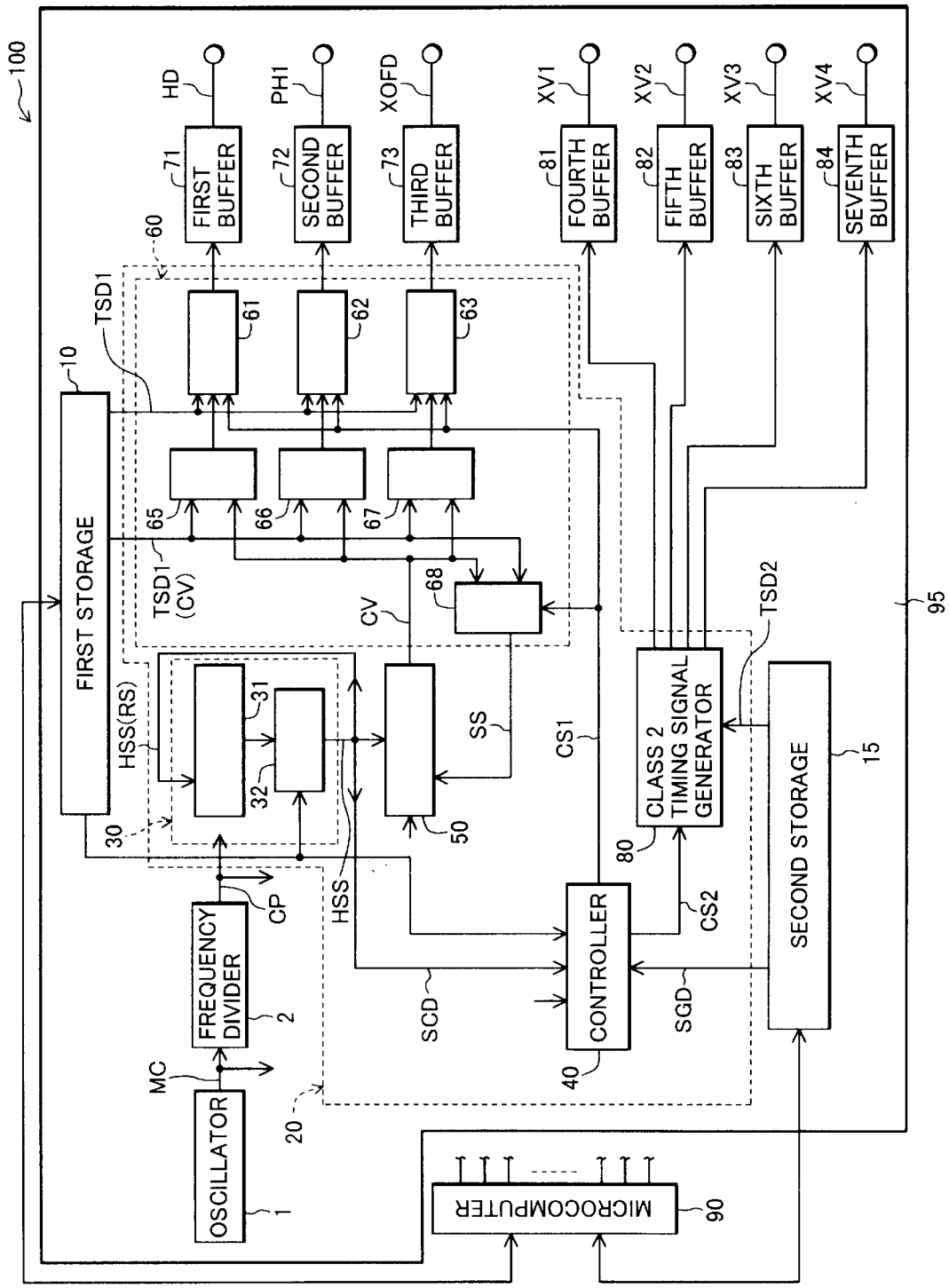
FIG. 1 is a block diagram schematically showing constitution of a timing signal generating device according to an embodiment.

FIG. 1 illustratively shows structure of a timing signal generating device according to an embodiment.

A timing signal generating device 100 of FIG. 1 generates timing signals necessary to drive a solid-state image pickup device of CCD type used as an area image sensor.

Figure 11:
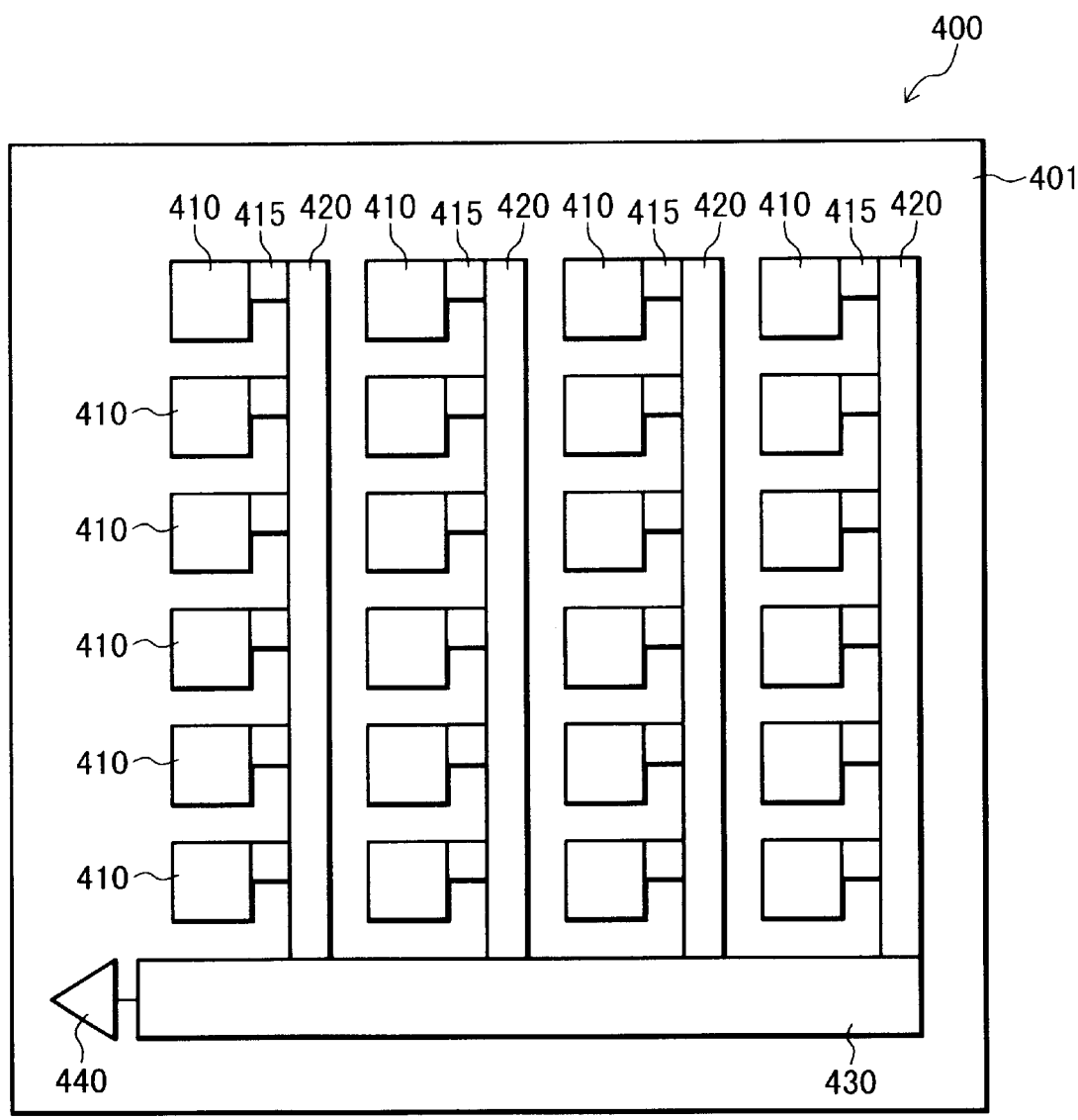
FIG. 11 is a plan view schematically showing a CCD-type solid-state image pickup device.

As shown in FIG. 11, in the CCD-type solid-state image pickup device 400, a plurality of photoelectric converter elements (e.g., photo diodes) 410 are formed in a matrix shape in one surface of a semiconductor substrate 401. An actual CCD-type image-pickup device includes several hundreds of thousand of photoelectric converters elements to several million photoelectric converter elements.

For each column of photoelectric converters 410, one vertical transfer CCD (VCCD) 420 is disposed. For example, one horizontal transfer CCD (HCCD) 430 is electrically connected to each vertical transfer CCD 420. For example, an output amplifier 440 is connected to an output port of the horizontal CCD.

Each photoelectric converter element 410 accumulates a quantity of signal charge representing a quantity of light incident thereto. The signal charge is then read therefrom to be fed to an associated vertical transfer CCD 420 through a readout gate 415 and is transferred to the horizontal transfer CCD 430.

From the photoelectric converter elements 410 of one photoelectric converter element row, signal charges are read to be fed to the respectively associated vertical transfer CCDs 420 at equal timing. Each of these signal charges is transferred to the horizontal transfer CCD 430, for example, at equal timing. Each vertical transfer CCD 420 is driven by, for example, four-phase driving signals.

The horizontal transfer CCD 430 transfers the signal charges received from each vertical transfer CCD 420 to the output amplifier 440. The horizontal transfer CCD 430 is driven by, for example, two-phase driving signals.

The output amplifier 440 generates image signals by using the signal charges received from the horizontal transfer CCD 430 and sends the image signals to a predetermined circuit, for example, externally disposed with respect to the solid-state image pickup device 400.

The solid-state image pickup device 400 is capable of generating and outputting the image signals for one frame during a plurality of horizontal scan periods. The horizontal scan period is repeatedly established with a fixed repetition period. Within one horizontal scan period, image signals representing signal charges accumulated in the photoelectric converter elements 410 of one photoelectric converter element row are generated and outputted from the solid-state image pickup device 400.

In some case, adjacent two or more signal charges are added or summed each other in each vertical transfer CCD 420 and transferred to the horizontal transfer CCD 430.

In this case, the solid-state image pickup device 400 is capable of generating and outputting the image signals representing signal charges accumulated in the photoelectric converter elements 410 of two or more photoelectric converter element rows within one horizontal scan period.

The timing signal generating device 100 shown in FIG. 1 includes an oscillator 1, a frequency divider 2, a first storage 10, a second storage 15, a timing signal generator 20, first to third buffers 71 to 73, and fourth to seventh buffers 81 to 84. Operation of the timing signal generating device 100 is entirely controlled by, for example, an external microcomputer 90. These constituent components except the external microcomputer 90 are integrated on one semiconductor substrate 95.

The oscillator 1 generates a master clock signal MC. The frequency divider 2 divides the master clock signal MC to generate a clock pulse signal CP and sends the signal CP to a horizontal scan period start signal generator 30 of the timing signal generator 20. The oscillator 1 and the divider 2 start operation immediately after the timing signal generating device 100 is powered.

Although not shown in FIG. 1, the clock pulse signal CP generated by the frequency divider 2 is supplied to various sections in addition to the signal generator 30. This is also the case with the master clock signal MC generated by the oscillator 1.

The first storage 10 is composed, for example, of a group of registers. The first storage 10 stores class 1 timing signal generating data.

The second storage 15 is composed, for example, of a semiconductor memory having a large capacity such as a static random access memory (SRAM), a dynamic random access memory (DRAM), or an electrically erasable programmable read only memory (EEPROM). The second storage 15 stores class 2 timing signal generating data and signal generation control data.

The first and second storages 10 and 15 are rewritable storages. Data stored therein can be rewritten by a control unit such as a microcomputer. One semiconductor memory with large capacity may be subdivided into two partitions for the first and second storages 10 and 15.

A solid-state image pickup device used for an area image sensor is designed to be driven under at least one operation mode. For example, a solid-state image pickup device used for a digital still camera is designed to be driven under two operation modes, i.e., a still picture mode and a movie picture mode. The timing signal generating device 100 has one operation mode for one operation mode of the solid-state image pickup device. Therefore, the timing signal generating device 100 has at least one operation mode.

Furthermore, the timing signal generating device 100 is designed to start operation of generating various kinds of timing signals immediately after the timing signal generating device 100 is powered or after resuming from a sleeping or standby state thereof. That is the timing signal generating device 100 also has a forced operation mode.

In one mode of the timing signal generating device 100, one sequence control operation is carried out. Sequence control specifying data to identify a sequence control operation to be achieved is stored in, for example, the first storage 10.

Each time an apparatus using the solid-state image pickup device is powered, the class 1 timing signal generating data, the class 2 timing signal generating data, the signal generation control data, and sequence control specifying data are read from a read-only memory (ROM), not shown, in response to an instruction from, for example, the microcomputer 90 and are written in the first storage 10 or the second storage 15.

The first storage 10 or the second storage 15 may be implemented by a nonvolatile memory. In this case, it is not necessary to write data once stored in the nonvolatile memory need again therein each time an apparatus using the solid-state image pickup device is powered.

To define one horizontal scan period by the clock pulse signal CP generated by the frequency divider 2, a numerical data representing the number of clock pulses equivalent to the number of clock pulses in one horizontal scan period is stored in, for example, the first storage 10.

The timing signal generator 20 generates various kinds of class 1 and class 2 timing signals according to the class 1 timing signal generating data, the class 2 timing signal generating data, and the signal generation control data.

The timing signal generator 20 includes, for example, a horizontal scan period start signal generator 30, a controller 40, a timing signal generating counter 50, a class 1 timing signal generator 60, and a class 2 timing signal generator 80.

The horizontal scan period start signal generator 30 generates a horizontal scan period start signal to indicate a start point of a horizontal scan period. The generator 30 includes, for example, a horizontal scan period setting counter 31 to count the number of clock pulses in the clock pulse signal CP fed from the frequency divider 2 and a comparator 32 to receive the numerical data representing the number of clock pulses to define a length of one horizontal scan period and the count value signal from the counter 31.

The comparator 32 generates a control operation signal when the count value signal from the counter 31 matches the numerical data representing the number of clock pulses equivalent to the number of clock pulses in one horizontal scan period. The control operation signal corresponds to the horizontal scan period start signal HSS.

The signal HSS from the comparator 32 is fed to the controller 40, the timing signal generating counter 50, and the horizontal scan period setting counter 31. In response to the signal HSS, the counter 31 resets the count value (counted number). The signal HSS serves as a reset signal RS in the counter 31.

Having received the signal HSS (reset signal RS), the counter 31 starts again counting the number of the clock pulses in the clock pulse signal CP fed from the frequency divider 2. That is, the horizontal scan period start signal generator 30 repeatedly generates the horizontal scan period start signal HSS with a fixed repetition period.

The controller 40 includes, for example, a logic circuit conducting a desired function, a storage, and the like. The controller 40 includes a microprocessor depending on cases.

The controller 40 receives signal generation control data SGD from the second storage 15 and the horizontal scan period start signals HSS from the horizontal scan period start signal generator 30. The controller 40 beforehand receives a signal indicating an operation mode of the solid-state image pickup device and accordingly identifies sequence control specifying data to be used.

Having received the signal HSS, the controller 40 receives from, for example, the first storage 10, sequence control specifying data SCD to be used. According to a sequence control operation identified by the data SCD, the controller 40 sequentially conducts operations according to predetermined records in the signal generation control data SGD received from the second storage 15.

The controller 40 sends first control signals CS1 to the class 1 timing signal generator 60 and second control signals CS2 to the class 2 timing signal generator 80.

To operate the timing signal generating device 100 under the forced operation mode, operations, for example, following operations (i) to (vii) are sequentially conducted, and the controller 40 receives the signal generation control data SGD from the second storage 15.

(i) The microcomputer 90 writes class 1 timing signal generating data TSD1, class 2 timing signal generating data TSD2, signal generation control data SGD, and sequence control specifying data SCD in the first storage 10 or the second storage 15.

(ii) The microcomputer 90 writes a code indicating a sequence control specifying data SCD to be used under the forced operation mode in a sequence register of the first storage 10.

(iii) After the code is written in the sequence register under the forced operation mode, a signal indicating a next operation mode of the solid-state image pickup device is fed from the first storage 10 to the controller 40.

(iv) The controller 40 reads predetermined data from the first storage 10 according to the sequence control operation under the forced operation mode and resets the horizontal scan period setting counter 31. The controller 40 sends a numerical data representing the number of the clock pulses in the clock pulse signal CP equivalent to the number of the clock pulses in one horizontal scan period from the first storage 10 to the comparator 32.

(v) The comparator 32 starts repeatedly generating a horizontal scan period start signal HSS.

(vi) Having received one horizontal scan period start signal HSS and the signal indicating the next operation mode of the solid-state image pickup device, the controller 40 identifies one sequence control specifying data SCD corresponding to the operation mode of the solid-state image pickup device and then reads the data SCD from the first storage 10.

(vii) The controller 40 receives, from the second storage 15, signal generation control data SGD necessary for the sequence control identified by the sequence control specifying data SCD.

The timing signal generating counter 50 receives a clock pulse signal CP from the frequency divider 2 and a horizontal scan period start signal HSS from the horizontal scan period start signal generator 30. The signal HSS resets the timing signal generating counter 50 and restarts the timing signal generating counter 50 the count operation. The counter 50 therefore starts again counting the number of clock pulses in the clock pulse signal CP. Count value signals CV obtained from the counter 50 are fed to the class 1 timing signal generator 60.

The generator 60 generates various kinds of the class 1 timing signals according to the class 1 timing signal generating data TSD1 fed from the first storage 10, the count value signals CV fed from the timing signal generating counter 50, and the first control signals CS1 fed from the controller 40.

The class 1 timing signal generator 60 can be composed of, for example, one pulse generator for each kind of class 1 timing signal to be generated and at leas one comparator for each of the pulse generator.

The pulse generator includes, for example, a flip-flop circuit, a logic circuit, and the like.

For each pulse generator, there are disposed, for example, two comparators. One of the comparators detects timing for a timing signal rise point and the other one thereof detects timing for a timing signal fall point.

FIG. 1 shows only three pulse generators, i.e., first to third pulse generators 61 to 63 for simplicity of the drawing. Only one comparator is shown for each pulse generator. That is, a first comparator 65 for the first pulse generator 61, a second comparator 66 for the second pulse generator 62, and a third comparator 67 for the third pulse generator 63.

The number of kinds of class 1 timing signals to be generated by the class 1 timing signal generator 60 varies depending on specifications, performance, and the like of the solid-state image pickup device to be driven by the timing signals. In a CCD-type solid-state image pickup device, for example, for a digital camera, about six to about 12 kinds of class 1 timing signals are generated.

Each of the count value signals CV from the timing signal generating counter 50 is used to specify a timing in each horizontal scan period. The count value signals CV are fed to the first to third comparators 65 to 67. The count value signals CV are also fed to a fourth comparator 68 disposed in the class 1 timing signal generator 60.

A numerical data representing timing for starting a generation of a predetermined timing signal, for example, a horizontal sync pulse in the class 1 timing signal is fed from the first storage 10 to the first comparator 65. Another numerical data representing another timing for starting a generation of another signal, for example, first-phase pulse to drive a 2-phase drive horizontal transfer CCD is fed from the first storage 10 to the second comparator 66. Still another numerical data representing still another timing for starting a generation of still another signal, for example, an overflow drain pulse for an electronic shutter is fed from the first storage 10 to the third comparator 67.

Of the two comparators associated with one pulse generator 65, 66 or 67, one comparator not shown in FIG. 1 receives a numerical data representing timing for the timing signal fall point form the first storage 10.

Each of the first to third comparators 65 to 67 compares the numerical data TSD1 (CV) representing the timing for starting a generation of the signal fed from the first storage 10 with the count value signals fed from the timing signal generating counter 50. When the value defined by the data TSD1 (CV) and the value represented by the count value signal are equal to each other, the pertinent comparator 65, 66 or 67 generates a control operation signal. Each of the comparators 65 to 67 sends a control operation signal to an associated first, second or third pulse generators 61, 62 or 63.

Each of the first to third pulse generators 61 to 63 receives a predetermined first control signal CS1 from the controller 40, individually.

Of the class 1 timing signal generating data TSD1, predetermined data, for example, horizontal sync pulse generating data is fed from the first storage 10 to the first pulse generator 61. For example, first-phase pulse generating data to drive a 2-phase drive horizontal transfer CCD is fed from the first storage 10 to the second pulse generator 62. For example, overflow drain pulse generating data for an electronic shutter is fed from the first storage 10 to the third pulse generator 63.

Each of the first to third pulse generators 61 to 63 generates a predetermined class 1 timing signal according to the control operation signal from the associated one of the first to third comparators 65 to 67, the first control signal CS1 from the controller 40, and the data from the first storage 10.

The predetermined class 1 timing signal, for example, a horizontal sync pulse HD generated by the first pulse generator 61 is outputted via a first buffer 71. The predetermined class 1 timing signal, for example, a first-phase horizontal transfer pulse PH1 generated by the second pulse generator 62 to drive a two-phase drive horizontal transfer CCD is outputted via a second buffer 72. The predetermined class 1 timing signal, for example, an overflow drain pulse XOFD for an electronic shutter generated by the third pulse generator 63 is outputted via a second buffer 73.

The overflow drain pulse XOFD for an electronic shutter generated by the third pulse generator 63 is not directly used, but is inverted before use thereof. A timing signal which is inverted before use is assigned with a reference symbol beginning with "X".

Another numerical data in the class 1 timing signal generating data is fed from the first storage 10 to the fourth comparator 68. This data represents termination of a count operation and is called a "count end value data" hereinafter.

When the count value (counted number) of the timing signal generating counter 50 becomes equal to a value defined by the count end value data, the fourth comparator 68 generates a control operation signal (counter stop signal SS). The signal SS is fed to the counter 50. Having received the signal SS, the counter 50 stops the counting operation.

As above, on receiving the horizontal scan period start signal HSS, the controller 40 starts generating the second control signals CS2 and feeds the signals CS2 to the class 2 timing signal generator 80.

Having received the class 2 timing signal generating data TSD2 from the second storage 15 and the second control signals CS2 from the controller 40, the generator 80 generates a predetermined number of kinds of class 2 timing signals. The class 2 timing signal generator 80 is composed of, for example, a read address control circuit for define a read address of the second storage 15, a register to store data read from the storage 15, a logic circuit, and the like.

Each of the class 2 timing signals generated by the generator 80 is outputted via, for example, a buffer.

FIG. 1 shows only four buffers, i.e., the fourth to seventh buffers 81 to 84 for simplicity of the drawing. For example, a first-phase vertical transfer pulse XV1 to drive a four-phase drive vertical transfer CCD is outputted via the fourth buffer 81, a second-phase vertical transfer pulse XV2 is outputted via the fifth buffer 82, a third-phase vertical transfer pulse XV3 is outputted via the sixth buffer 83, and a fourth-phase vertical transfer pulse XV4 is outputted via the seventh buffer 84.

The number of kinds of class 2 timing signals to be generated by the class 2 timing signal generator 80 varies depending on specifications, performance, and the like of the solid-state image pickup device to be driven by using the timing signal generating device. In a CCD-type solid-state image pickup device, for example, for a digital camera, about six to about 20 kinds of class 2 timing signals are generated.

According to a generation end code of a class 2 timing signal from the second storage 15, the class 2 timing signal generator 80 holds a signal level of each class 2 timing signal at the end point of the class 2 timing signal generation.

FIG. 2 partly shows an example of the signal generation control data SGD stored in the second storage 15 in a block diagram. The example of FIG. 2 shows 12 records. Actually, the number of records is more than 12 in general.

For example, records 1 to 7 indicate a content of one sequence control operation corresponding to an operation mode of a solid-state image pickup device. For example, records 8 to 12 indicate a content of one sequence control operation corresponding to another operation mode of the solid-state image pickup device.

Each record of FIG. 2 includes a first field in which a control code is recorded, a second field in which an iteration count code is recorded, a third field in which a start address is recorded, and a fourth field in which an operation setting code is recorded.

The control code indicates content of control in binary notation. For example, a code "00" indicates execution of an operation and a code "11" indicates termination of operations according to one sequence control operation. In this case, the code "11" is an end code.

The iteration count code indicates in binary notation, for example, one (1) or more numerals representing one horizontal scan period or successive horizontal scan periods. An operation to be controlled by an associated control code is executed once in every horizontal scan period associated with the count code. The second field in which an iteration count code is recorded helps minimization of the total quantity of signal generation control data SGD. The storage capacity necessary to store the signal generation control data SGD can be also minimized.

The start address indicates a start address of data, included in signal generation control data SGD, defining an operation to be controlled by an associated control code. When the control code is an end code, a no-operation instruction may be recorded in the third field.

The operation setting code indicates in binary notation, for example, absence or a point of time of generation of a timing signal within a horizontal scan period in which an operation to be controlled by an associated control code is executed. When the control code is an end code, a no-operation instruction may be recorded in the fourth field.

FIG. 3 partly shows an example of the class 2 timing signal generating data TSD2 being stored in the second storage 15 in a block diagram. The example shows 12 records. Actually, more than 12 records are stored in the second storage 15.

For example, records 1 to 10 represent a generation pattern of a particular class 2 timing signal TSD2 and a record 11 and subsequent records represent another generation pattern of the class 2 timing signal.

Each record of FIG. 3 includes a first field in which a control code is recorded, a second field in which an iteration count code is recorded, and a third field in which a signal pattern code is recorded.

The control code indicates content of control in binary notation. For example, a code "00" indicates generation of a timing signal, a code "11" indicates termination of a generation of a timing signal, a code "01" indicates start of loop processing, and a code "10" indicates an end of loop processing.

The iteration count code indicates in binary notation, for example, (i) length of a period in which an operation to be controlled by an associated control code is repeatedly executed or (ii) the number of repetition of an operation, the operation to be controlled by an associated control code, to be executed. The length of the period is indicated, for example, by the number of clock pulses in the clock pulse signal CP (in binary notation).

When the control code indicates the end of generation of a timing signal, the start of loop processing, or the end of loop processing, a no-operation instruction may be recorded in the associated second field.

Disposition of the second field in which the iteration count code is recorded helps minimize the total quantity of the class 2 timing signal generating data TSD2. The storage capacity necessary to store the class 2 timing signal generating data TSD2 can be also minimized.

The signal pattern code indicates, for example, a signal pattern of one kind of class 2 timing signal identified by the record including this signal pattern code or a signal pattern of a plurality of kinds of class 2 timing signal identified by the record including this signal pattern code.

For example, a signal pattern of each of the first-phase to fourth-phase vertical transfer pulses to drive a four-phase drive vertical transfer CCD can be represented as "0101". The left-most "0" indicates that the first-phase vertical transfer pulse XV1 is at a low level. The second numeral "1" relative to the left-most point indicates that the second-phase vertical transfer pulse XV2 is at a high level. The third numeral "0" relative to the left-most point indicates that the third-phase vertical transfer pulse XV3 is at a low level. The fourth numeral "1" relative to the left-most point indicates that the fourth-phase vertical transfer pulse XV4 is at a high level.

When the control code indicates the end of generation of a timing signal, the start of loop processing, or the end of loop processing, a no-operation instruction may be recorded in the third field.

Figure 4:
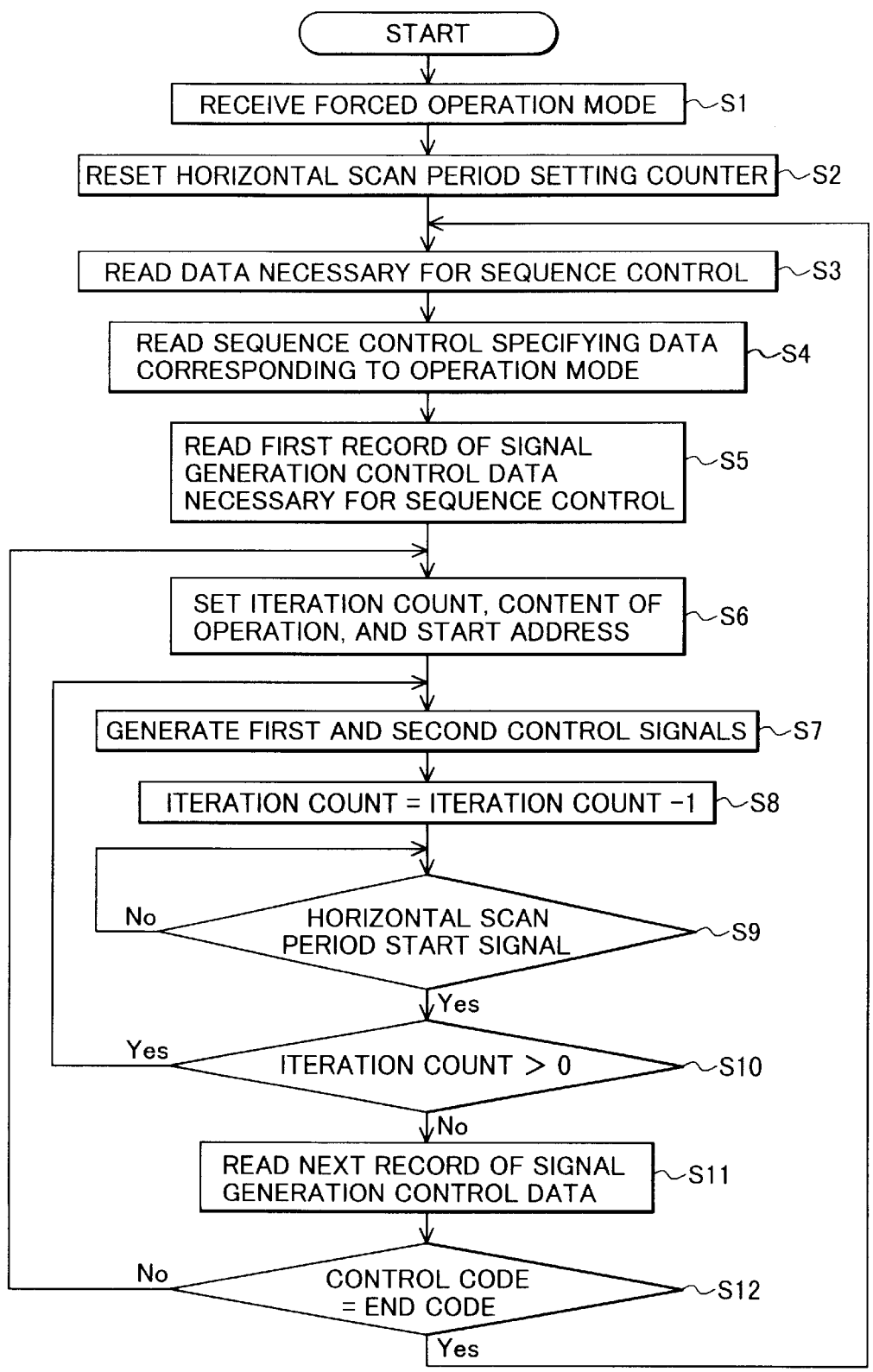
FIG. 4 is a flowchart schematically showing an example of operation of a controller in the timing signal generating device of the embodiment.

FIG. 4 shows a flowchart schematically showing an example operation of the controller 40 of the timing signal generating device 100 shown in FIG. 1. The flowchart schematically shows an example of operation of the controller 40 after the system is powered.

Referring now to FIG. 4, description will be given in detail of the operation of the controller 40. The reference numerals used in FIG. 1 will be used in the description below.

When the system is powered, the system immediately enters the forced operation mode as above.

In step S1, a signal of the forced operation mode is received.

In step S2, the horizontal scan period setting counter 31 is reset. Data representing the number of clock pulses equivalent to the number of clock pulses in one horizontal scan period is being supplied from the first storage 10 to the comparator 32 of the horizontal scan period start signal generator 30. Thereafter, the comparator 32 repeatedly generates the horizontal scan period start signal HSS using the output resultant from comparison.

In step S3, data necessary for a sequence control operation is read from the first storage 10

In step S4, one sequence control specifying data SCD corresponding to the operation mode of the solid-state image pickup device is read from the first storage 10.

In step S5, a first record of the signal generation control data SGD necessary for the sequence control operation identified by the data SCD obtained in step 4 is read from the second storage 15.

In step S6, the iteration count, the content of operation, and the start address are set according to an iteration count code, an operation setting code, and a start address recorded in the record obtained in step S5.

In step S7, first control signals CS1 and second control signals CS2 are generated. On receiving the first or second control signals CS1 or CS2, the class 1 or class 2 timing signal generator 60 or 80 generates predetermined timing signals.

In step S8, a decrement operation is conducted to subtract one from the iteration count set in step 6.

In step S9, a check is made to determine whether or not a subsequent horizontal scan period start signal HSS has been received from the horizontal scan period start signal generator 30. The check is repeatedly executed until the subsequent horizontal scan period start signal HSS is received from the generator 30. When the signal HSS is received, the process goes to step S10.

In step 10, a check is made to determine whether or not a result of operation in step 8 is larger than zero (0). If the result is larger, the process returns to step S7 to repeatedly execute processing from step S7 to step S10. If the result of operation in step S8 is equal to zero (0), no iteration is required and hence process goes to step S11.

In step 11, a next record of the signal generation control data SGD necessary for sequence control identified by the sequence control specifying data SCD read in step S4 is read from the second storage 15.

In step S12, a check is made to determine whether or not a control code in the record obtained in step S11 is an end code. If the control code is an end code, it is assumed that processing in one horizontal scan period has been completed and hence the process returns to step S2 to repeatedly execute processing from step S2 to step S12. If the control code is other than an end code, the process returns to step S6 to repeatedly execute processing from step S6 to step S12.

Figure 5:
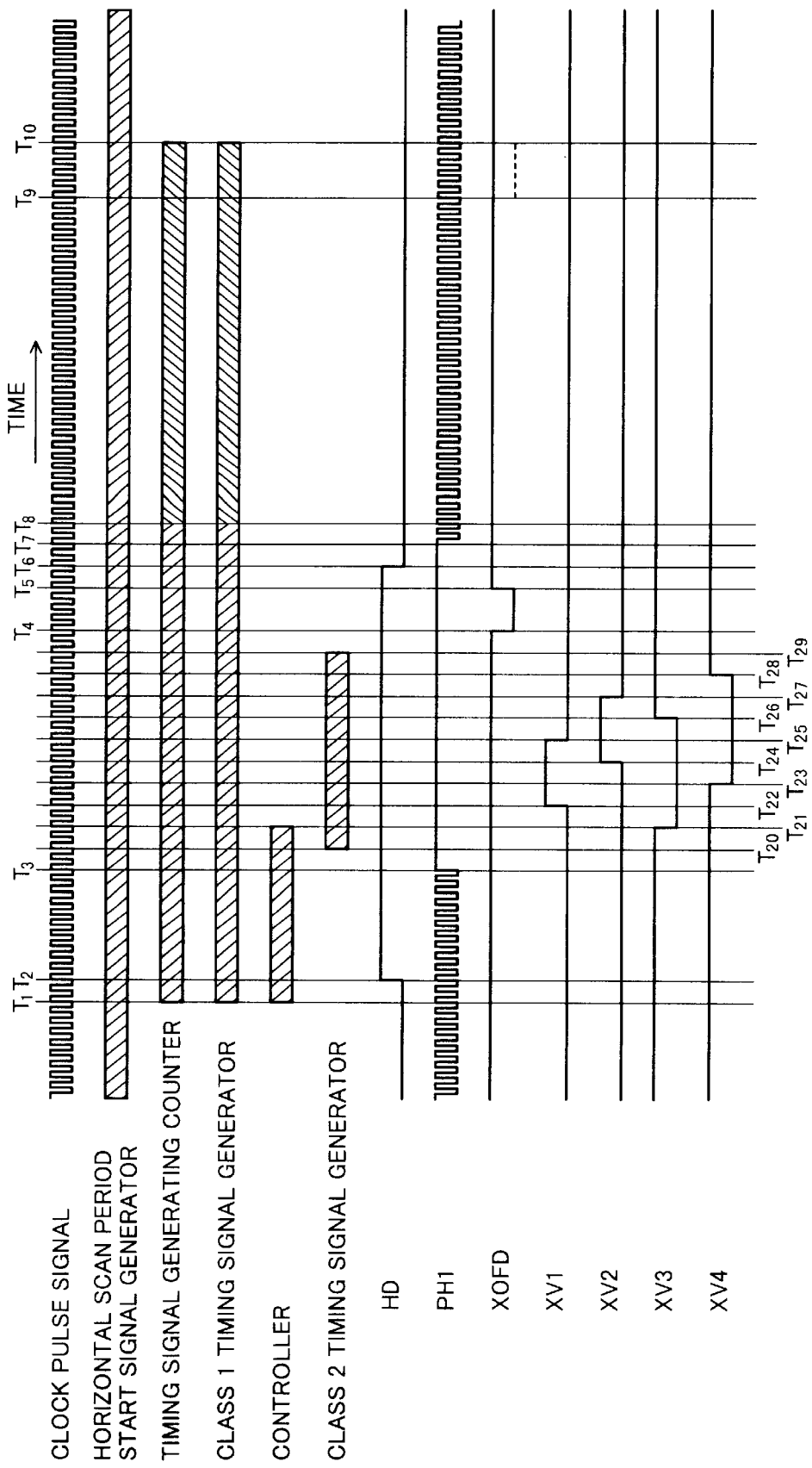
FIG. 5 is a signal timing chart of the timing signal generating device of the embodiment showing an example of operation timing respectively of a horizontal scan period start signal generator, a timing signal generating counter, a class 1 timing signal generator, a controller, and a class 2 timing signal generator, and an example of pulse waveforms respectively of a horizontal sync signal HD, a first-phase horizontal transfer pulse PH1 to drive a horizontal transfer CCD of two-phase drive type, an overflow drain pulse XOFD for an electronic shutter, and vertical transfer pulses, i.e., a first-phase vertical transfer pulse XV1 to a fourth-phase vertical transfer pulse XV4 to drive vertical transfer CCDs of four-phase drive type.

FIG. 5 shows, in a signal timing chart, an example of operation timing respectively of the horizontal scan period start signal generator 30, the timing signal generating counter 50, the class 1 timing signal generator 60, the controller 40, and the class 2 timing signal generator 80, and an example of pulse waveforms respectively of the horizontal sync signal HD, the first-phase horizontal transfer pulse PH1 to drive a horizontal transfer CCD of two-phase drive type, the overflow drain pulse XOFD for electronic shutter, and the first-phase to fourth-phase vertical transfer pulses XV1 to XV4 to drive vertical transfer CCDs of four-phase drive type. However, part of the reference numerals of FIG. 1 is not used in FIG. 5.

The second-phase horizontal transfer pulse PH2 to drive the horizontal transfer CCD of two-phase drive type is not shown in FIG. 5. The pulse PH2 has a phase inverse to that of the first-phase horizontal transfer pulse PH1.

As can be seen from the operation timing of the controller 40, the signal timing chart of FIG. 5 applies to a mode other than the forced operation mode. In FIG. 5, an operating state of each constituent element of the timing signal generating device is indicated by a hatched zone. When a pertinent element is in other than an operating state, no hatching is shown. That is, the hatched zone indicates that a constituent element corresponding thereto is in operation.

The oscillator 1, the frequency divider 2, and the horizontal scan period start signal generator 30 shown in FIG. 1 start operation immediately after the system is powered. The oscillator 1 generates the master clock signal MC, the frequency divider 2 divides the frequency of the master clock signal MC to generate the clock pulse signal CP. The horizontal scan period setting counter 31 of the horizontal scan period start signal generator 30 counts the number of clock pulses in the clock pulse signal CP. When the count value (counted number) becomes equal to a predetermined value, i.e., the number of clock pulses equivalent to the number of the clock pulses in one horizontal scan period, the generator 30 generates a horizontal scan period start signal HSS.

When the generator 30 generates the signal HSS at time $T_1$, the signal HSS is fed to the timing signal generating counter 50, the class 1 timing signal generator 60, and the controller 40. On receiving the signal HSS, the counter 50, the generator 60, and the controller 40 start operations, respectively. The counter 50 and the generator 60 operate from time $T_1$ to time $T_8$. The controller 40 operates from time $T_1$ to time $T_{21}$.

When it is necessary to generate an overflow drain pulse XOFD from time $T_9$ to time $T_{10}$, the timing signal generating counter 50 and the class 1 timing signal generator 60 operate from time $T_1$ to time $T_{10}$.

When the generator 60 starts operation, a signal to generate a horizontal sync signal HD changes its level to stay at a high level from time $T_2$ to time $T_6$, a signal to generate a first-phase horizontal transfer pulse HP1 changes its level to stay at a high level from time $T_3$ to time $T_7$ and a signal to generate an overflow drain pulse XOFD changes its level to stay at a low level from time $T_4$ to time $T_5$.

The state in which the signal to generate a horizontal sync signal HD is at a high level from time $T_2$ to time $T_6$ means that the signal HD is kept generated from time $T_2$ to time $T_6$. Similarly, the overflow drain pulse XOFD is kept generated from time $T_4$ to time $T_5$. The first-phase horizontal transfer pulse HP1 is kept substantially ungenerated from time $T_3$ to time $T_7$. In a period except a period from time $T_3$ to time $T_7$, the pulse HP1 has a pulse waveform equal to the clock pulse signal CP.

Accompanied with the operation of the controller 40, the class 2 timing signal generator 80 operates from time $T_{20}$ to time $T_{29}$. Resultantly, the vertical transfer pulses XV1 to XV4 are kept generated from time $T_{20}$ to time $T_{29}$.

The vertical transfer pulse XV1 is at a low level from time $T_{20}$ to time $T_{22}$, at a high level from time $T_{22}$ to time $T_{25}$, and again at a low level from time $T_{25}$ to time $T_{29}$. The vertical transfer pulse XV2 is at a low level from time $T_{20}$ to time $T_{24}$, at a high level from time $T_{24}$ to time $T_{27}$, and again at a low level from time $T_{27}$ to time $T_{29}$. The vertical transfer pulse XV3 is at a high level from time $T_{20}$ to time $T_{21}$, at a low level from time $T_{21}$ to time $T_{26}$, and again at a high level from time $T_{26}$ to time $T_{29}$. The vertical transfer pulse XV4 is at a high level from time $T_{20}$ to time $T_{23}$, at a low level from time $T_{23}$ to time $T_{28}$, and again at a high level from time $T_{28}$ to time $T_{29}$. By the vertical transfer pulses, each vertical transfer CCD transfers a signal charge read from an associated photoelectric converter element in one photoelectric converter element row to the horizontal transfer CCD side.

After time $T_{29}$, each of the vertical transfer pulses XV1 to XV4 keeps its signal level at the time $T_{29}$ until the class 2 timing signal generator 80 starts operation within a subsequent horizontal scan period.

FIG. 6 is a code table showing an example of class 2 timing signal generating data TSD2 to generate the vertical transfer pulses XV1 to XV4 shown in FIG. 5.

As can be seen from FIG. 6, the data is composed of 10 records, i.e., record 1 to record 10. Each record includes a first field in which a control code is recorded, a second field in which an iteration count code is recorded, and a third field in which signal pattern code is recorded. The records are sequentially read in this order from the second storage to be fed to the class 2 timing signal generator 80.

The control code indicates content of control. A code "00" indicates generation of a timing signal and a code "11" indicates an end of timing signal generation.

The iteration count code indicates length of a period in which an operation to be controlled by an associated control code is repeatedly executed, the length being represented by the number of clock pulses. The length is expressed in binary notation.

As indicated by a control code "11", record 10 is a record to terminate the timing signal generation. Therefore, the iteration count code "0000" in record 10 is a no-operation instruction satisfying the condition of the format.

In the signal pattern code, a numeral at the first position relative to the left end of the field indicates a signal level of the first-phase vertical transfer pulse XV1, a numeral at the second position relative to the left end of the field indicates a signal level of the second-phase vertical transfer pulse XV2, a numeral at the third position relative to the left end of the field indicates a signal level of the third-phase vertical transfer pulse XV3, and a numeral at the fourth position relative to the left end of the field indicates a signal level of the fourth-phase vertical transfer pulse XV4. A numeric value of 0 indicates that the pertinent signal is at a low level and a numeric value of 1 indicates that the pertinent signal is at a high level. When at least one of the vertical transfer pulses XV1 to XV4 takes three kinds of signal levels (three potential levels), it is only necessary that each signal level is represented by, for example, two bits and one signal pattern code is represented by eight bits.

Since record 10 is a record to terminate the timing signal generation, the iteration count code "0000" is a no-operation instruction satisfying the condition of the format.

Figure 7:
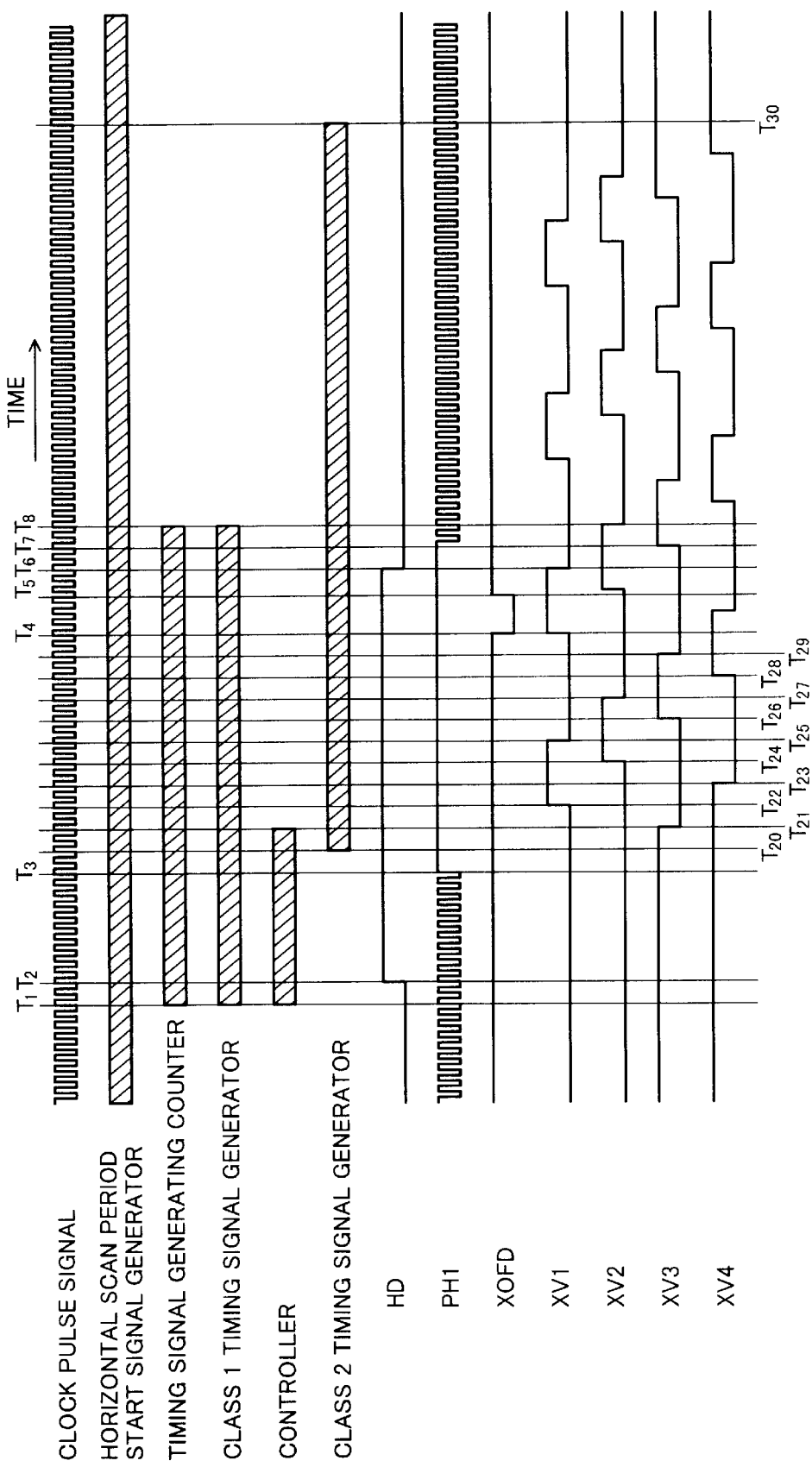
FIG. 7 is a signal timing chart of the timing signal generating device showing another example of operation timing respectively of the horizontal scan period start signal generator, the timing signal generating counter, the class 1 timing signal generator, the controller, and the class 2 timing signal generator, and another example of pulse waveforms respectively of the horizontal sync signal HD, the first-phase horizontal transfer pulse PH1 to drive the horizontal transfer CCD of two-phase drive type, the overflow drain pulse XOFD for the electronic shutter, and the vertical transfer pulses, i.e., the first-phase vertical transfer pulse XV1 to the fourth-phase vertical transfer pulse XV4 to drive the vertical transfer CCDs of four-phase drive type.

FIG. 7 shows, in a signal timing chart, another example of operation timing respectively of the horizontal scan period start signal generator 30, the timing signal generating counter 50, the class 1 timing signal generator 60, the controller 40, and the class 2 timing signal generator 80, and another example of pulse waveforms respectively of the horizontal sync signal HD, the first-phase horizontal transfer pulse PH1 to drive a horizontal transfer CCD of two-phase drive type, the overflow drain pulse XOFD for electronic shutter, and the first-phase to fourth-phase vertical transfer pulses XV1 to XV4 to drive vertical transfer CCDs of four-phase drive type. The reference numerals of FIG. 1 are partly omitted in FIG. 7.

The second-phase horizontal transfer pulse PH2 to drive the horizontal transfer CCD of two-phase drive type is not shown in FIG. 7. The pulse PH2 has a phase inverse to that of the first-phase horizontal transfer pulse PH1.

The example shown in FIG. 7 differs from that shown in FIG. 5 in that (i) the operation end point of the class 2 timing signal generator 80 is changed from time $T_{29}$ to time $T_{30}$ and (ii) each of the vertical transfer pulses XV1 to XV4 is generated from time $T_{20}$ to time $T_{30}$ and has a pulse waveform of almost four times repetition of a fundamental pulse waveform. The other operations are the same as those of the example shown in FIG. 5.

FIG. 8 is a code table showing an example of class 2 timing signal generating data TSD2 to generate the vertical transfer pulses XV1 to XV4 shown in FIG. 7.

As can be seen from FIG. 8, the data is composed of 12 records, i.e., record 1 to record 12. The records are sequentially read in this order from the second storage 15 to be fed to the class 2 timing signal generator 80 (FIG. 1).

Like the records shown in FIG. 6, each record includes a first field in which a control code is recorded, a second field in which an iteration count code is recorded, and a third field in which a signal pattern code is recorded. The same codes of FIG. 8 as those of FIG. 6 have the same functions as described in conjunction with FIG. 6. Only the codes first appearing in FIG. 8 will be described.

A control code "01" indicates a start of loop processing. Therefore, record 1 is a record indicating a start of loop processing. An iteration count code in record 1 is a binary number representing an iteration count of loop processing. In the example of FIG. 8, record 1 has an iteration count code of "0100" in binary notation, which is "4" in decimal notation. A signal pattern code "0000" of record 1 is a no-operation instruction satisfying the condition of the format.

A control code "10" indicates an end of loop processing. Therefore, record 10 is a record indicating an end of loop processing. An iteration count code "0000" and a signal pattern code "0000" in record 10 are no-operation instructions satisfying the condition of the format.

Since one loop processing is performed by executing operations according to the records from record 2 to record 9, the length of a term necessary to generate the vertical transfer pulses XV1 to XV4 by iterating the loop processing four times is shorter by two clock pulses than that shown in FIG. 7. Therefore, record 11 is disposed after record 10 indicating the end of loop processing to finally generate the vertical transfer pulses XV1 to XV4 each of which has a pulse waveform equivalent to a pulse waveform from time $T_{28}$ to time $T_{29}$ shown in FIG. 7.

After time $T_{30}$, each of the vertical transfer pulses XV1 to XV4 keeps the signal level at time $T_{30}$ until the operation of the class 2 timing signal generator 80 is started within a subsequent horizontal scan period.

The vertical transfer pulses XV1 to XV4 having pulse waveforms shown in FIG. 7 can be generated without executing the loop processing. However, the loop processing minimizes the total data amount of the class 2 timing signal generating data TSD2. The storage capacity necessary to store the data TSD2 can be also minimized.

Figure 9B:
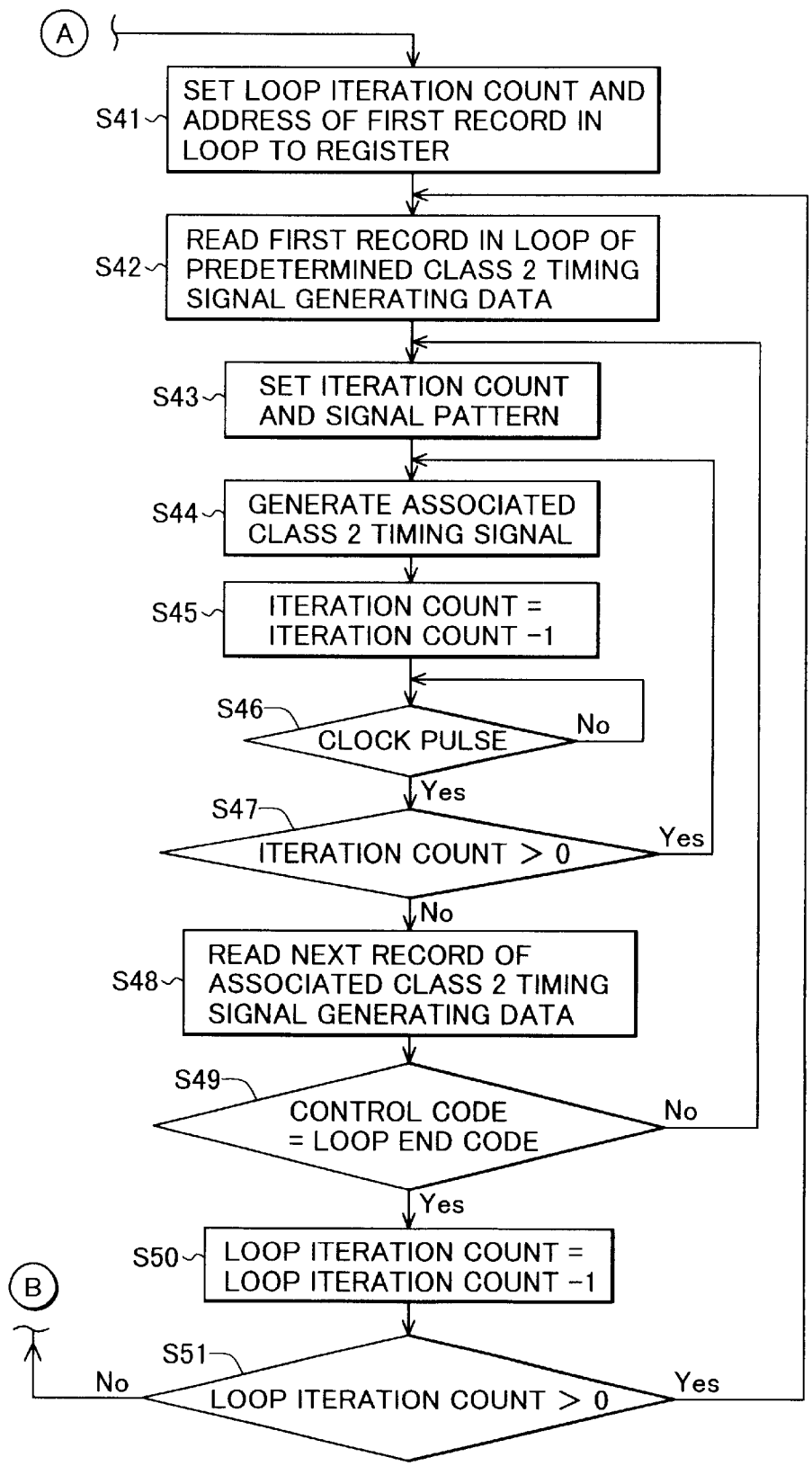

FIGS. 9A and 9B schematically shows, in a flowchart, an example of operation of the class 2 timing signal generator 80 of the timing signal generating device 100 shown in FIG. 1. In this example, the class 2 timing signal generator 80 executes steps S21 to steps S31, which will be described below, to generate predetermined class 2 timing signals. The reference numerals of FIG. 1 will be used in the description below.

In step S21, a check is made to determine whether or not the signal received from the controller 40 is an operation start signal. The operation is repeatedly executed until an operation start signal is received. When an operation start signal is received, processing goes to step S22. The operation start signal is one of the second control signals CS2 generated by the controller 4.

In step S22, a record stored at an address corresponding to a start address set in step 7 shown in FIG. 4 is read from the second storage 15. The record is included in the class 2 timing signal generating data TSD2.

In step S23, a check is made to determine whether or not a control code in the obtained record is a code indicating a start of loop processing. If the code indicates a start of loop processing, processing goes to step S41 shown in FIG. 9B, which will be described later. Otherwise, processing goes to step S24.

In step S24, an iteration count and a signal pattern are set according to an iteration count code and a signal pattern code in the record obtained in step S22.

In step S25, according to the iteration count and the signal pattern set in step S24 and the second control signals CS2 supplied from the controller 40, a predetermined class 2 timing signals corresponding to the record obtained in step S22 are generated.

In step S26, a decrement operation is conducted to subtract one from the iteration count set in step S24.

In step S27, a check is made to determine whether or not a subsequent clock pulse in the clock pulse signal CP is inputted. The operation is conducted until the clock pulse is received. When the clock pulse is received, processing goes to step S28.

In step S28, a check is made to determine whether or not a result of operation in step S26 is more than zero (0). If the result is more than zero, process returns to step S25 to repeatedly execute steps S25 to S28. If the result is zero, no iteration is required and hence process goes to step S29.

In step S29, a record subsequent to the record obtained in step S22 is read.

In step S30, a check is made to determine whether or not a control code in the record obtained in step S29 is an end code. If the control code is an end code, process goes to step S31. Otherwise, process returns to step S23 to repeatedly execute steps S23 to S30.

In step S31, a signal level of the class 2 timing signal generated in step S25 is held and the operation of the class 2 timing signal generator 80 is stopped.

If it is found in step S23 that the control code is a code indicating a start of loop processing, process jumps from step S23 to step S41.

In step S41, an iteration count is set according to an iteration count code for loop processing recorded in the record obtained in step S22. An address of a first record in the loop is set to a start address register.

In step S42, according to the start address set in step S41, a first record of class 2 timing signal generating data TSD2 to be first read in the loop processing is read.

In step S43, an iteration count and a signal pattern are set according to an iteration count code and a signal pattern code in the record obtained in step S42.

In step S44, according to the iteration count and the signal pattern set in step S43 and the second control signal CS2 supplied from the controller 40, a predetermined class 2 timing signal is generated corresponding to the record obtained in step S42.

In step S45, a decrement operation is conducted to subtract one from the iteration count set in step S43.

In step S46, a check is made to determine whether or not a subsequent clock pulse in the clock pulse signal CP is inputted. The operation is conducted until the clock pulse is received. When the clock pulse is received, processing goes to step S47.

In step S47, a check is made to determine whether or not a result of operation in step S45 is more than zero (0). If the result is more than zero, process returns to step S44 to repeatedly execute steps S44 to S47. If the result is zero, no iteration is required and hence process goes to step S48.

In step S48, a record subsequent to the record obtained in step S42 is read.

In step S49, a check is made to determine whether or not a control code in the record obtained in step S48 is an end code for loop processing. If the control code is an end code, process goes to step S50. Otherwise, process returns to step S43 to repeatedly execute steps S43 to S49.

Loop processing may be in a nested configuration in some cases. That is, the loop processing includes another loop processing.

In step S50, a decrement operation is conducted to subtract one from the iteration count for loop processing set in step S41.

In step S51, a check is made to determine whether or not a result of operation in step S50 is more than zero (0). If the result is more than zero, process returns to step S42 to repeatedly execute steps S42 to S51. If the result is zero, loop processing is terminated and hence process goes to step S29 shown in FIG. 9A to execute thereafter steps S29 to S31.

The first storage 10 and the second storage 15 shown in FIG. 1 are storages of which stored data can be rewritten by, for example, the microcomputer 90. The class 1 timing signal generating data TSD1, the class 2 timing signal generating data TSD2, and the signal generation control data SGD can be rewritten respectively at desired points of time.

Consequently, the generation points of time, the signal waveforms, and the like of various kinds of timing signals to drive a CCD-type or MOS-type solid-state image pickup device can be easily changed according specifications of such an electronic apparatus using the solid-state image pickup device as a video camera, a digital camera, a personal computer with a digital camera, a portable information assistant with a digital camera, a game player with a digital camera, a monitor camera, a camera for business use, a camera for broadcast, or a camera for industrial use. In the change of the generation points of time and the signal waveforms, the hardware itself of the timing signal generating device may be not changed.

If the sequence control specifying data SCD prepared one for one operation mode of the timing signal generating device are stored in the rewritable storage, the data SCD can also be rewritten at desired points of time. This makes it possible to more easily change the generation points of time, the signal waveforms, and the like of various kinds of timing signals to drive the solid-state image pickup device.

If the format of the class 1 timing signal generating data TSD1, the class 2 timing signal generating data TSD2, or the signal generation control data SGD includes a iteration count code as in the records shown in the embodiments, the data amount of the data can be minimized and the storage capacity to store the data can also be minimized. The data format is quite effective for the timing signal generating device to drive a CCD-type or MOS-type solid-state image pickup device and particularly also for an electronic apparatus, for example, a portable type electronic apparatus in which a memory of a large capacity cannot be readily installed.

Figure 10:
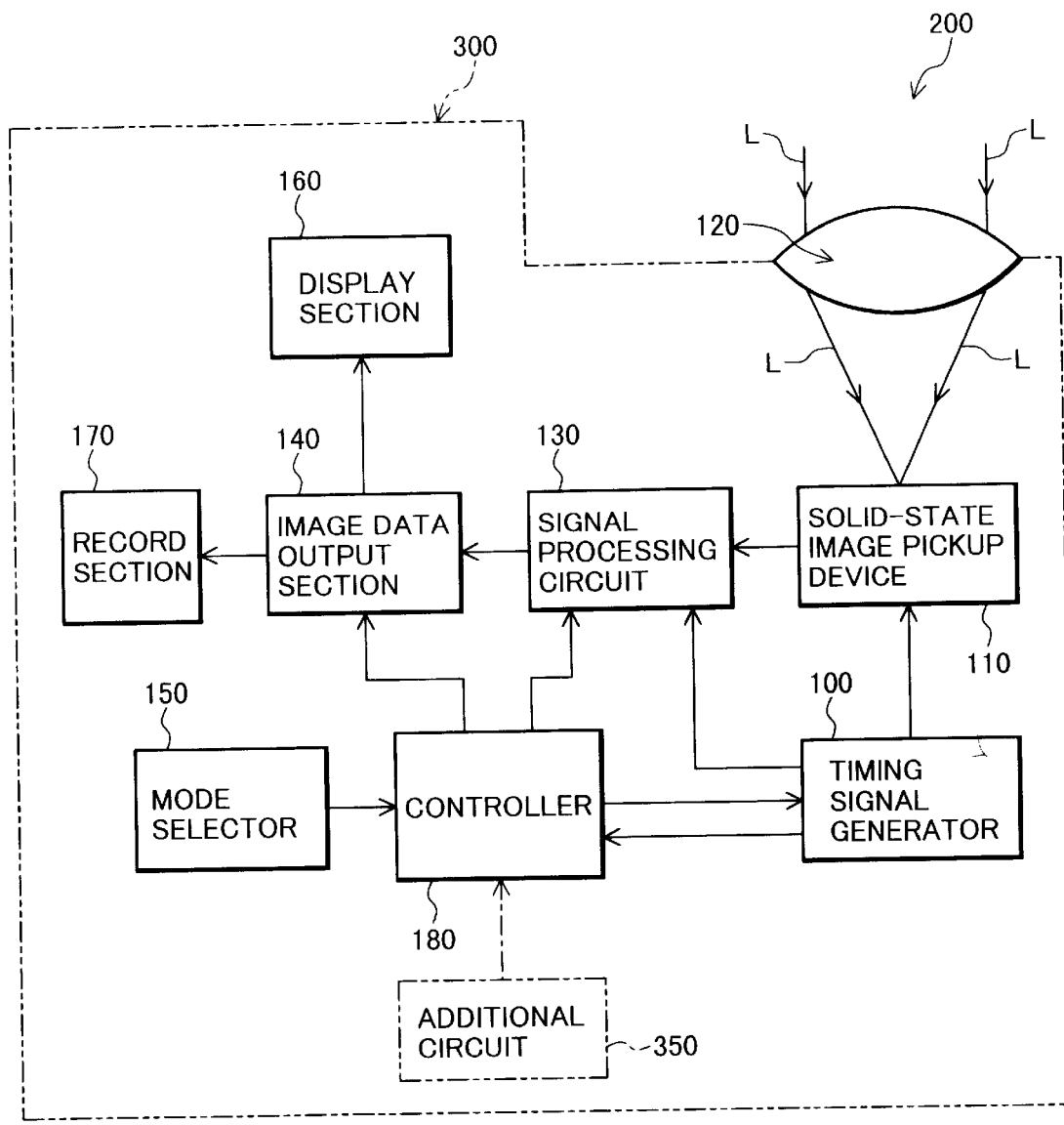
FIG. 10 is a block diagram schematically showing a digital camera employing a solid-state image pickup device to be driven by timing signals from the timing signal generating device shown in FIG. 1.

FIG. 10 schematically shows, in a block diagram, a digital camera 200 which is one of an electronic apparatus employing a solid-state image pickup device 110 to be driven by timing signals from the timing signal generating device 100 shown in FIG. 1.

In the digital camera 200, an optical system 120 including optical lenses, an iris, an optical low-pass filter, and the like is arranged ahead of (in an optical path of a incident light to the solid-state image pickup device 110) the solid-state image pickup device 110. In FIG. 10, an image of one optical lens represents the optical system 120.

The solid-state image pickup device 110 is driven by using the timing signals generated by the timing signal generating device 100, converts an image of an object focused by the optical system 120 into electric signals (image signals), and supplies the signals to a signal processing circuit 130.

The circuit 130 executes various processing for image signals from the image pickup device 110 to generate pixels signal for reproduced image. The circuit 130 includes, for example, an analog-to-digital (A/D) converter, a correlating double sampling (CDS) circuit, a color separation circuit, a delay line, and the like.

The pixels signal for reproduced image are fed from the circuit 130 to an image data output section 140 to be stored therein. Thereafter, the pixels signal for reproduced image are fed to a display section 160 or a storage 170 depending on an output mode selected by a mode selector 150.

The image data output section 140 includes, for example, a storage medium such as a frame memory.

The mode selector 150 selects an image pickup mode of the solid-state image pickup device 110 and also serves as a selection switch to select an output destination of the pixels signal for reproduced image. The mode selector 150 is operated by a user of the digital camera 200.

The display section 160 displays a still picture or a movie picture according to the pixels signal for reproduced image fed from the image data output section 140. The display section 160 includes a display such as a liquid crystal display.

The record section 170 records the pixels signal for reproduced image fed from the image data output section 140 on a recording medium, for example, a memory card.

The controller 180 controls operation of the timing signal generating device 100, the image signal processing circuit 130, and the image data output section 140. The controller 180 includes, for example, a central processing unit (CPU).

Although the example of the electronic apparatus is a digital camera 200 in FIG. 10, an image pickup apparatus employing a solid-state image pickup device may be installed in another electronic apparatus such as a personal computer and a cellular telephone.

When an image pickup apparatus employing a solid-state image pickup device is installed in another electronic apparatus, a predetermined circuit necessary to drive the electronic apparatus 300 with an image pickup apparatus (the digital camera 200 in the example of FIG. 10) is electrically connected as an additional circuit 350 to the controller 180, for example, as indicated by a virtual line (two-dot-and-dash line) in FIG. 10.

When the electronic apparatus 300 is, for example, a personal computer, the additional circuit 350 includes an input device, a main memory, a central processing unit, and the like. The display section 160 can serve as a display of the personal computer and the record section 170 can serve as an auxiliary storage thereof.

When the electronic apparatus 300 is, for example, a cellular telephone which can be connected to the internet, the additional circuit 350 includes a transmitter, a receiver, a communication unit, a data input key unit, a main memory, a central processing unit, and the like. The display section 160 can serve as a display of the cellular telephone and the record section 170 can serve as an auxiliary storage thereof.

When the additional circuit 350 includes a central processing unit, the central processing unit may serve as the controller 180.

Description has been given of an embodiment of a timing signal generating device, a timing signal generation method in the timing signal generating device, electronic apparatuses employing a solid-state image pickup device driven by timing signals from the timing signal generating device, and data formats of data employed to generate desired timing signals in the timing signal generating device. However, the present invention is not limited to the embodiment or examples described above.

For example, although the embodiment of a timing signal generating device shown in FIG. 1 includes the oscillator 1 and the frequency divider 2, the oscillator 1 and the frequency divider 2 are not indispensable constituent components of the timing signal generating device 100. The timing signal generating device 100 may be designed to receive the master clock signal MC or the clock pulse signal CP from an external device. The timing signal generating device 100 may also be designed to operate according to the master clock signal MC, not the clock pulse signal CP.

Similarly, the controller 40, the buffers 71 to 73, and the buffers 81 to 84 are not indispensable constituent components of the timing signal generating device 100.

In place of the controller 40, an external computer, for example, the microcomputer 90 shown in FIG. 1 may be employed. The controller 40 or the external computer for the controller 40 may be set to start operation in response to reception of the horizontal scan period start signal HSS from the horizontal scan period start signal generator 30 or a control operation signal from the timing signal generating counter 50.

The buffers 71 to 73 and the buffers 81 and 84 may be dispensed with. In place of the buffers, a driver directly drive the solid-state image pickup device may be employed.

To prevent noise induced by the count operation from leaking into the image signals from the solid-state image pickup device, a gray code counter is desirably employed for each of the horizontal scan period setting counter 31 and the timing signal generating counter 50.

The gray code counter 50 represents a count value (counted number) with a reflected binary code.

In a usual counter, the number of carry signal varies for each clock and hence many carry signals may be simultaneously produced. In this situation, noise induced by the carry signals is superimposed over image signals. This deteriorates quality of reproduced image. In a gray code counter, however, only one bit is inverted for each clock. Therefore, the induced noise is advantageously minimized.

Although the signal generation control data SGD shown in FIG. 2 includes records each of which has a field (third field) in which an operation setting code is recorded, the operation setting code may be omitted from the signal generation control data SGD. In this case, data defining the operation setting is stored in, for example, the first storage 10. The operation setting data stored in the first storage 10 can be supplied to the class 1 or class 2 timing signal generator 60 or 80 at a predetermined point of time under control of, for example, the microcomputer 90.

The signal generation control data SGD may include, like the class 2 timing signal generating data shown in FIG. 8, a record indicating a start of loop processing and a record indicating an end of loop processing. By processing the signal generation control data SGD using loop processing, the total data amount of the signal generation control data SGD can be decreased. The storage capacity to store the signal generation control data SGD is accordingly decreased.

When one or more loop processing is executed to process the class 2 timing signal generating data TSD2 or the signal generation control data SGD, each loop processing may include a single loop processing or nesting type loop processing.

By synchronizing the generation of the class 1 and class 2 timing signals with an vertical sync pulse signal generated by an external generator, and generating the class 1 and class 2 timing signals beginning at a start point of each sequence, synchronization with external devices can be easily achieved. In this case, the sequence starts at timing of vertical synchronization.

A timing signal generating device to generate timing signals necessary to drive a solid-state image pickup device other than the CCD-type solid-state image pickup device, for example, a MOS-type solid-state image pickup device can also be designed in almost the same way as the timing signal generating device 100 shown in FIG. 1. However, the contents of data to be stored in the first and second storages 10 and 15 are different from those of the generating device 100 shown in FIG. 1.

Also in an MOS-type solid-state image pickup device, as in a CCD-type solid-state image pickup device, a large number of photoelectric converter elements, e.g., photodiodes are formed in a matrix shape in one surface of a semiconductor substrate. For each photoelectric converter element, about three to about four switching elements, e.g., MOS transistors are disposed.

For example, to control each of the switching elements used for an equal purpose in a unit of photoelectric converter element row, a predetermined number of control signal lines are arranged for each photoelectric converter element row.

For example, one output signal line is disposed for each photoelectric converter element column, and a load resistor is arranged for each output signal line. The output signal line has desirably low electric resistance and is made of a metallic material in usual cases.

By controlling operation of predetermined switching elements, an image signal (analog voltage signal) representing quantity of signal charge accumulated in a photoelectric converter element can be generated in each output signal line.

The image signal (analog voltage signal) generated in the output signal line is detected by, for example, a sample-and-hold (sample/hold) circuit. The detect signal is then directly fed to a predetermined circuit externally disposed with respect to the solid-state image pickup device by, for example, a horizontal shift register. Alternatively, the detect signal is first converted into a digital signal and is fed to the external predetermined circuit by, for example, a horizontal shift register.

Also after the image signal is generated in the output signal line, signal charge remains in the photoelectric converter element. By controlling operation of predetermined switching element, the signal charge can be absorbed in, for example, a power source voltage.

It is to be appreciated that those skilled in the art can change, modify, or combine the embodiment and examples in various ways.

As above, according to the present invention, generating points of time, signal waveforms, and the like of various kinds of timing signals to drive a device such as a solid-state image pickup device can be easily changed according to specifications of an apparatus using the device.

Consequently, a desired timing signal generating device can be easily provided at a relatively low price and in a short period.

What I claim are:

1. A timing signal generating device for generating timing signals adapted for driving a solid-state image pickup device, wherein the image pickup device has a large number of photoelectric converter elements arranged in a row and column matrix and is capable of generating and outputting image signals for one frame in a plurality of horizontal scan periods, the image signals being generated and outputted within one horizontal scan period represent signal charges accumulated in the photoelectric converter elements of at least one row, the image pickup device has at least one operation mode, a plurality of operations is done in every said operation mode, the timing signal generating device comprising:

at least one rewritable storage formed on a semiconductor substrate, for rewritably storing data; and a timing signal generator integrated together with said storage on the semiconductor substrate for receiving clock pulses, counting number of the clock pulses and generating, according to the data stored in said storage, a sequence of timing signals of a plurality of kinds for every operation mode of the solid-state image pickup device.

2. A timing signal generating device according to claim 1, wherein said storage stores timing signal generating data including:

(i) class 1 timing signal generating data defining a plurality of kinds of class 1 timing signals each of which has a constant pulse waveform, said class 1 timing signals including a plurality of timing signals to be generated in every said horizontal scan period;

(ii) class 2 timing signal generating data defining a plurality of kinds of class 2 timing signals each of which is generated in said horizontal scan periods and in each of which a pulse waveform or number of pulses in a horizontal scan period is not fixed; and (iii) signal generation control data for controlling generation of said class 1 timing signals and said class 2 timing signals in a unit of said one horizontal scan period.

3. A timing signal generating device according to claim 2, wherein said storage further stores at least two kinds of sequence control specifying data for defining separate sequence controls for separate operation modes of the solid-state image pickup device.

4. A timing signal generating device according to claim 3, wherein said storage comprises:

a first storage for storing said class 1 timing signal generating data and said sequence control specifying data; and a second storage for storing said class 2 timing signal generating data and said signal generation control data.

5. A timing signal generating device according to claim 4, wherein:

said first storage comprises a plurality of registers; and said second storage comprises a semiconductor memory.

6. A timing signal generating device according to claim 2, wherein said timing signal generator comprises:

a horizontal scan period start signal generator for repeatedly counting said clock pulses, repeatedly detecting timing by comparing number of the counted clock pulses with a data representing number of the clock pulses in said horizontal scan period, and generating a horizontal scan period start signal and resetting the count of clock pulses each time the timing is detected;

a timing signal generating counter for counting number of the clock pulses, said counter starting the count upon reception of said horizontal scan period start signal, stopping said count when the counted number becomes equal to a value for stopping said count operation, and generating a control operation signal when the counted number becomes equal to a predetermined value;

a controller for reading, upon reception of said horizontal scan period start signal or of said control operation signal, said signal generation control data from said storage in a sequence associated with operation mode of the solid-state image pickup device and for generating first control signals for controlling generation of said class 1 timing signals and second control signals for controlling generation of said class 2 timing signals;

a class 1 timing signal generator for detecting timing by comparing said class 1 timing signal generating data with the count number of said timing signal generating counter and for generating a plurality of kinds of class 1 timing signals according to said class 1 timing signal generating data and said first control signals; and a class 2 timing signal generator for generating a plurality of kinds of class 2 timing signals according to said class 2 timing signal generating data and said second control signals.

7. A timing signal generating device according to claim 6, wherein said storage further stores a numerical data representing number of said clock pulses in said horizontal scan period and another numerical data representing said counted number for stopping the count operation.

8. A timing signal generating device according to claim 6, wherein said horizontal scan period start signal generator includes a gray code counter.

9. A timing signal generating device according to claim 2, wherein said signal generation control data includes at least one record for every operation mode of the solid-state image pickup device, every said record includes a first field in which a control code for controlling one of the operations is recorded, a second field in which a code indicating one or more numerals representing one horizontal scan period or successive horizontal scan periods, said operation is executed once in every said horizontal scan period, is recorded, and a third field in which a start address in said at least one rewritable storage, first record of a data defining the operation to be controlled by said control code being recorded at said start address, is recorded.

10. A timing signal generating device according to claim 9, wherein every said record further includes a fourth field in which a code indicating absence or a point of time of generation of an associated class 1 or 2 timing signal within said horizontal scan period or periods, the operation to be controlled by said control code is executed in said horizontal scan period or periods, is recorded.

11. A timing signal generating device according to claim 2, wherein said class 2 timing signal generating data includes at least one record for every operation mode of the solid-state image pickup device, every said record includes a first field in which a control code for controlling one of the operations is recorded, a second field in which a code indicating (i) length of a period in which an operation to be controlled by said control code is repeatedly executed or (ii) number of repetition of said operation to be executed, is recorded, and a third field in which a code indicating a signal pattern of class 2 timing signals to be generated or no-operation instruction is recorded.

12. A timing signal generating device according to claim 1, wherein said at least one rewritable storage comprises non-volatile memory.

13. An electronic apparatus, comprising; an electronic device driven by using (i) a plurality of kinds of first timing signals each of which is generated with a fixed repetition period and has a constant pulse waveform in every repetition period and (ii) a plurality of kinds of second timing signals each of which is generated in said repetition periods and in each of which the pulse waveform or number of pulses in said repetition period is not fixed, the generation of said first and second timing signals in every said repetition period is defined by signal generation control data, the electronic device has at least one operation mode, a plurality of operations is done in every said operation mode; and a timing signal generating device for generating said first and second timing signals adapted for driving said electronic device, wherein said signal generation control data includes at least one record for every operation mode of said electronic device, every said record includes a first field in which a control code for controlling one of the operations is recorded, a second field in which a code indicating one or more numerals representing one repetition period or successive repetition periods, said operation is executed once in every said repetition period, is recorded, and a third field in which a start address in said at least one rewritable storage, first record of a data defining the operation to be controlled by said control code being recorded at said start address, is recorded.

14. An electronic apparatus according to claim 13, wherein every said record further includes a fourth field in which a code indicating absence or a point of time of generation of an associated first or second timing signal within said repetition period or periods, the operation to be controlled by said control code is executed in said repetition period or periods, is recorded.

15. An electronic apparatus according to claim 13, wherein said electronic device is a solid-state image pickup device having a large number of photoelectric converter elements arranged in a row and column matrix and being capable of generating and outputting image signals for one frame in a plurality of horizontal scan periods, the image signals being generated and outputted within one horizontal scan period represent signal charges accumulated in the photoelectric converter elements of at least one row, the image pickup device has at least one operation mode, a plurality of operations is done in every said operation mode, said fixed repetition period is a repetition period of said horizontal scan period;

said first timing signals include class 1 timing signals adapted for driving the solid-state mage pickup device; and said second timing signals include class 2 timing signals adapted for driving the solid-state image pickup device.

16. A timing signal generating device for generating timing signals, said device comprising:

a solid-stage image pickup device having a plurality of photoelectric converter elements arranged in a row and column matrix, capable of generating and outputting image signals for one frame in a plurality of horizontal scan periods, said image signals being generated and outputted with one horizontal scan period represent signal charges accumulated in the photoelectric converter elements of at least one row, said image pickup device having at least one operation mode, a plurality of operations being performed in each of said plurality of operation modes;

at least one rewritable storage, formed on a semiconductor substrate, for rewritably storing data; and a timing signal generator integrated together with said storage on said semiconductor substrate for receiving clock pulses, for counting the number of clock pulses, and for generating a sequence of timing signals of a plurality of kinds for each of said plurality of operation modes of the solid-state image pickup device, said sequence of timing signals being generated according to data stored in said storage.

17. A timing signal generating device according to claim 16, wherein said storage stores timing signal generating data including:

(i) class 1 timing signal generating data defining a plurality of kinds of class 1 timing signals each of which has a constant pulse waveform, said class 1 timing signals including a plurality of timing signals to be generated in every said horizontal scan period;

(ii) class 2 timing signal generating data defining a plurality of kinds of class 2 timing signals each of which is generated in said horizontal scan periods and in each of which a pulse waveform or number of pulses in a horizontal scan period is not fixed; and (iii) signal generation control data for controlling generation of said class 1 timing signals and said class 2 timing signals in a unit of said one horizontal scan period.

18. A timing signal generating device according to claim 17, wherein said storage further stores at least two kinds of sequence control specifying data for defining separate sequence controls for separate operation modes of the solid-state image pickup device.

19. A timing signal generating device according to claim 18, wherein said storage comprises:

a first storage for storing said class 1 timing signal generating data and said sequence control specifying data; and a second storage for storing said class 2 timing signal generating data and said signal generation control data.

20. A timing signal generating device according to claim 19, wherein:

said first storage comprises a plurality of registers; and said second storage comprises a semiconductor memory.

21. A timing signal generating device according to claim 17, wherein said timing signal generator comprises:

a horizontal scan period start signal generator for repeatedly counting said clock pulses, repeatedly detecting timing by comparing number of the counted clock pulses with a data representing number of the clock pulses in said horizontal scan period, and generating a horizontal scan period start signal and resetting the count of clock pulses each time the timing is detected;

a timing signal generating counter for counting number of the clock pulses, said counter starting the count upon reception of said horizontal scan period start signal, stopping said count when the counted number becomes equal to a value for stopping said count operation, and generating a control operation signal when the counted number becomes equal to a predetermined value;

a controller for reading, upon reception of said horizontal scan period start signal or of said control operation signal, said signal generation control data from said storage in a sequence associated with operation mode of the solid-state image pickup device and for generating first control signals for controlling generation of said class 1 timing signals and second control signals for controlling generation of said class 2 timing signals;

a class 1 timing signal generator for detecting timing by comparing said class 1 timing signal generating data with the count number of said timing signal generating counter and for generating a plurality of kinds of class 1 timing signals according to said class 1 timing signal generating data and said first control signals; and a class 2 timing signal generator for generating a plurality of kinds of class 2 timing signals according to sad class 2 timing signal generating data and said second control signals.

22. A timing signal generating device according to claim 21, wherein said storage further stores a numerical data representing number of said clock pulses in said horizontal scan period and another numerical data representing said counted number for stopping the count operation.

23. A timing signal generating device according to claim 21, wherein said horizontal scan period start signal generator includes a gray code counter.

24. A timing signal generating device according to claim 17, wherein said signal generation control data includes at least one record for every operation mode of the solid-state image pickup device, every said record includes a first field in which a control code for controlling one of the operations is recorded, a second field in which a code indicating one or more numerals representing one horizontal scan period or successive horizontal scan periods, said operation is executed once in every said horizontal scan period, is recorded, and a third field in which a start address in said at least one rewritable storage, first record of a data defining the operation to be controlled by said control code being recorded at said start address, is recorded.

25. A timing signal generating device according to claim 24, wherein every said record further includes a fourth field in which a code indicating absence or a point of time of generation of an associated class 1 or 2 timing signal within said horizontal scan period or periods, the operation to be controlled by said control code is executed in said horizontal scan period or periods, is recorded.

26. A timing signal generating device according to claim 17, wherein said class 2 timing signal generating data includes at least one record for every operation mode of the solid-state image pickup device, every said record includes a first field in which a control code for controlling one of the operations is recorded, a second field in which a code indicating (i) length of a period in which an operation to be controlled by said control code is repeatedly executed or (ii) number of repetition of said operation to be executed, is recorded, and a third field in which a code indicating a signal pattern of class 2 timing signals to be generated or no-operation instruction is recorded.

27. A timing signal generating device according to claim 16, wherein said at least one rewritable storage comprises non-volatile memory.

* * * * *